Sept. 23, 1930.   T. H. SEELY   1,776,397
MACHINE FOR USE IN THE MANUFACTURE OF BOOTS AND SHOES
Original Filed May 12, 1920   19 Sheets-Sheet 2

INVENTOR.
Thomas H. Seely
By his Attorney,
Nelson W. Howard

Sept. 23, 1930.　　　T. H. SEELY.　　　1,776,397
MACHINE FOR USE IN THE MANUFACTURE OF BOOTS AND SHOES
Original Filed May 12, 1920　　19 Sheets-Sheet 6

INVENTOR
Thomas H. Seely
By his Attorney

Sept. 23, 1930.                T. H. SEELY                  1,776,397
           MACHINE FOR USE IN THE MANUFACTURE OF BOOTS AND SHOES
                    Original Filed May 12, 1920    19 Sheets-Sheet 7

INVENTOR
Thomas H. Seely
By his Attorney
Nelson W. Howard

Sept. 23, 1930. T. H. SEELY 1,776,397
MACHINE FOR USE IN THE MANUFACTURE OF BOOTS AND SHOES
Original Filed May 12, 1920 19 Sheets-Sheet 9

INVENTOR.
Thomas H. Seely
By his Attorney,
Nelson W. Howard

Sept. 23, 1930.        T. H. SEELY        1,776,397
MACHINE FOR USE IN THE MANUFACTURE OF BOOTS AND SHOES
Original Filed May 12, 1920    19 Sheets-Sheet 10

INVENTOR.
Thomas H. Seely
By his Attorney,
Nelson W. Howard

Sept. 23, 1930.   T. H. SEELY   1,776,397
MACHINE FOR USE IN THE MANUFACTURE OF BOOTS AND SHOES
Original Filed May 12, 1920   19 Sheets-Sheet 11

INVENTOR
Thomas H. Seely
By his Attorney
Nelson W. Howard

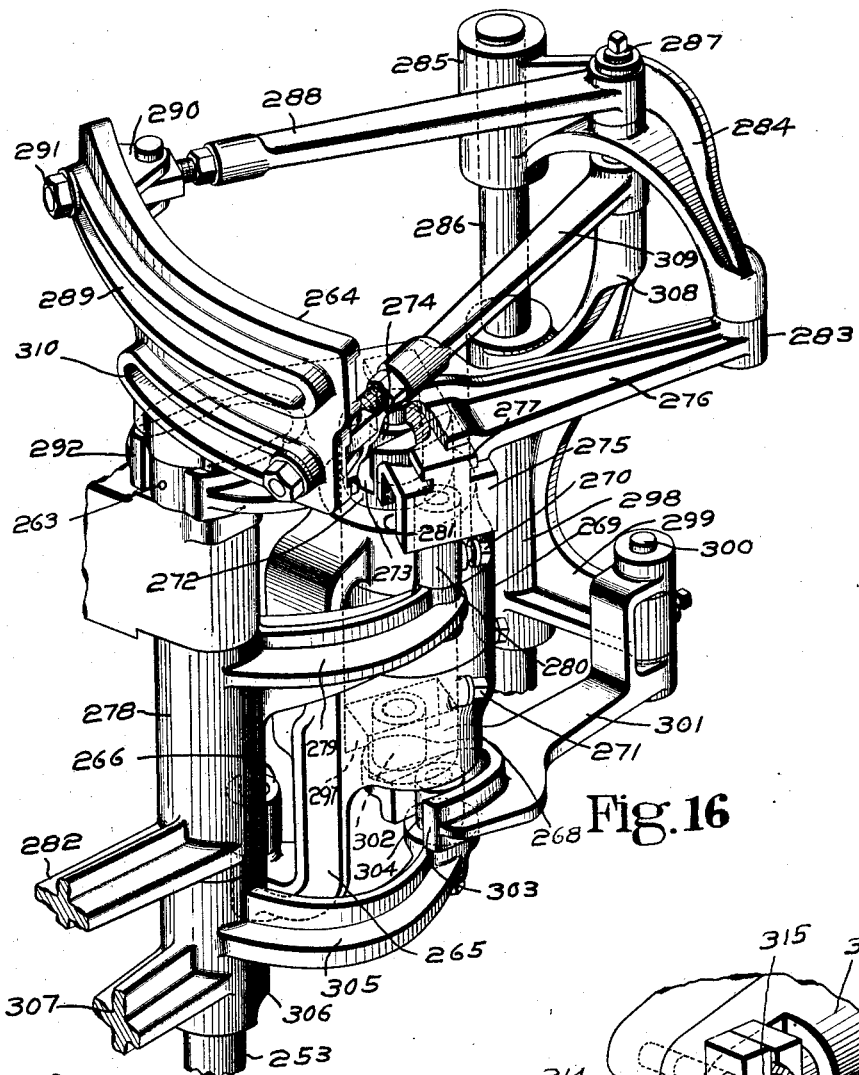
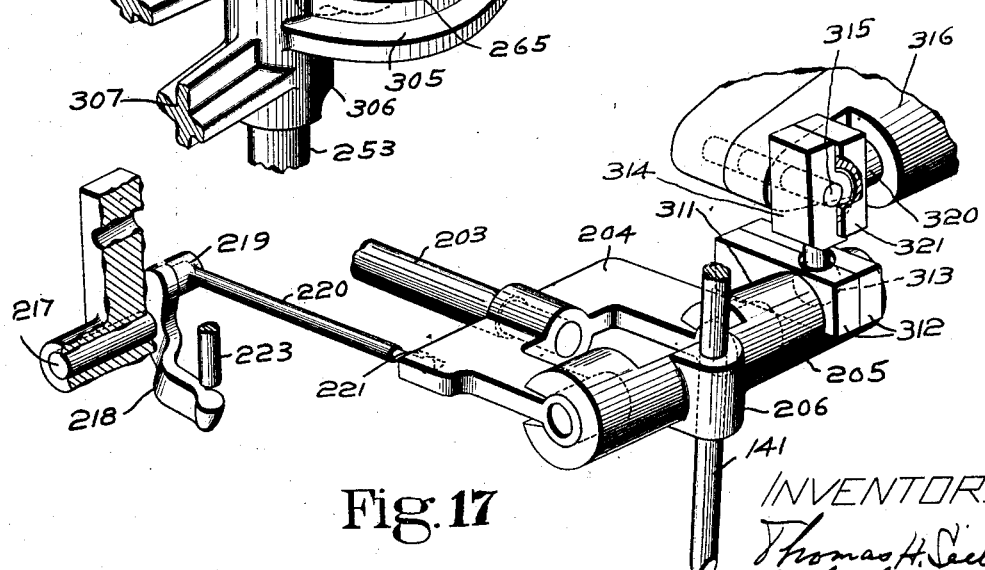

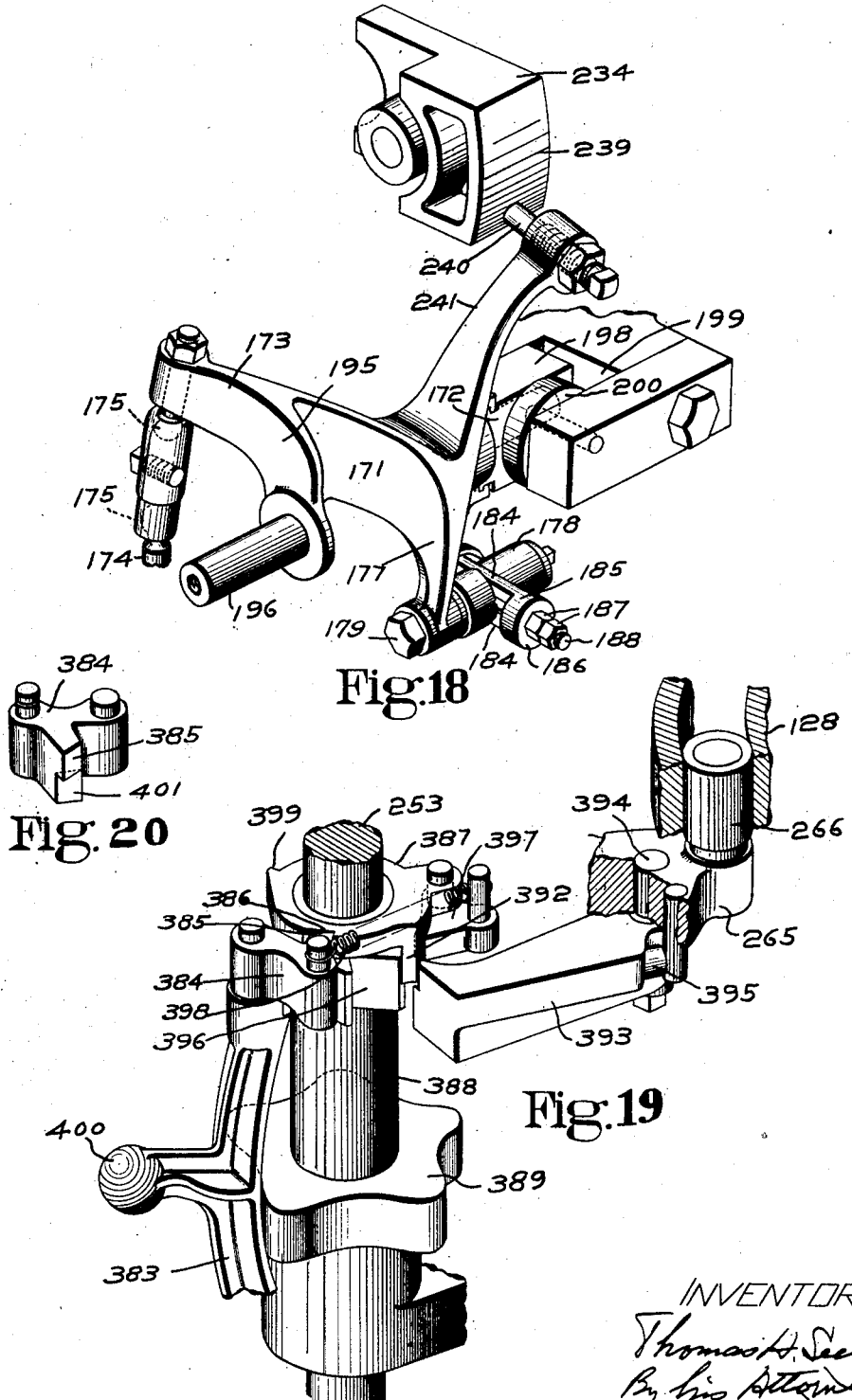

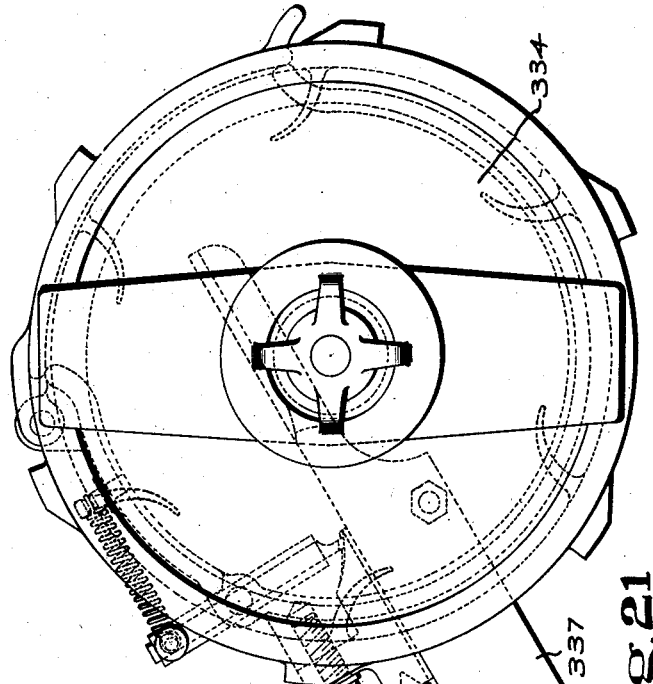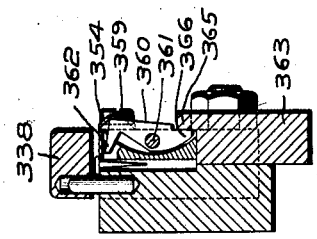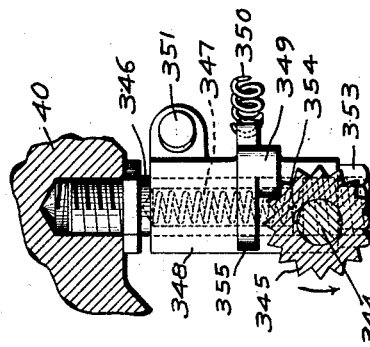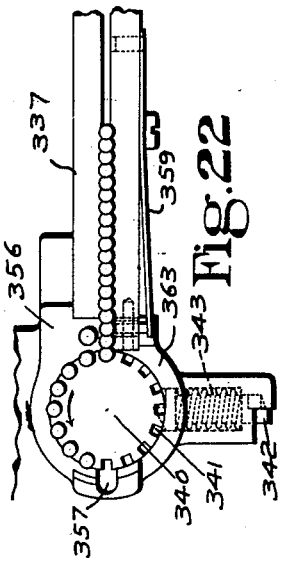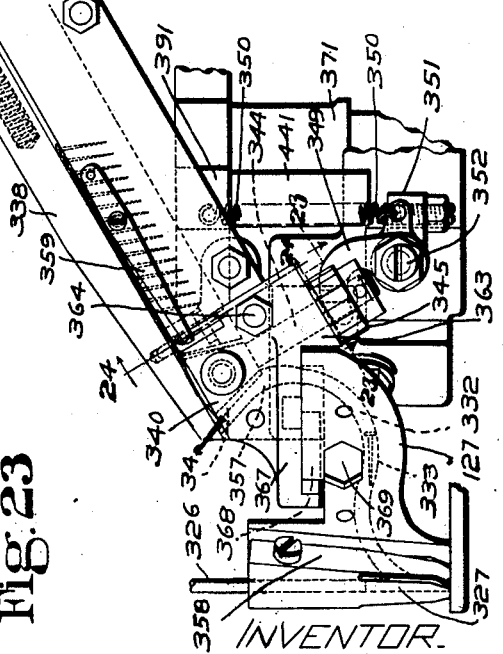

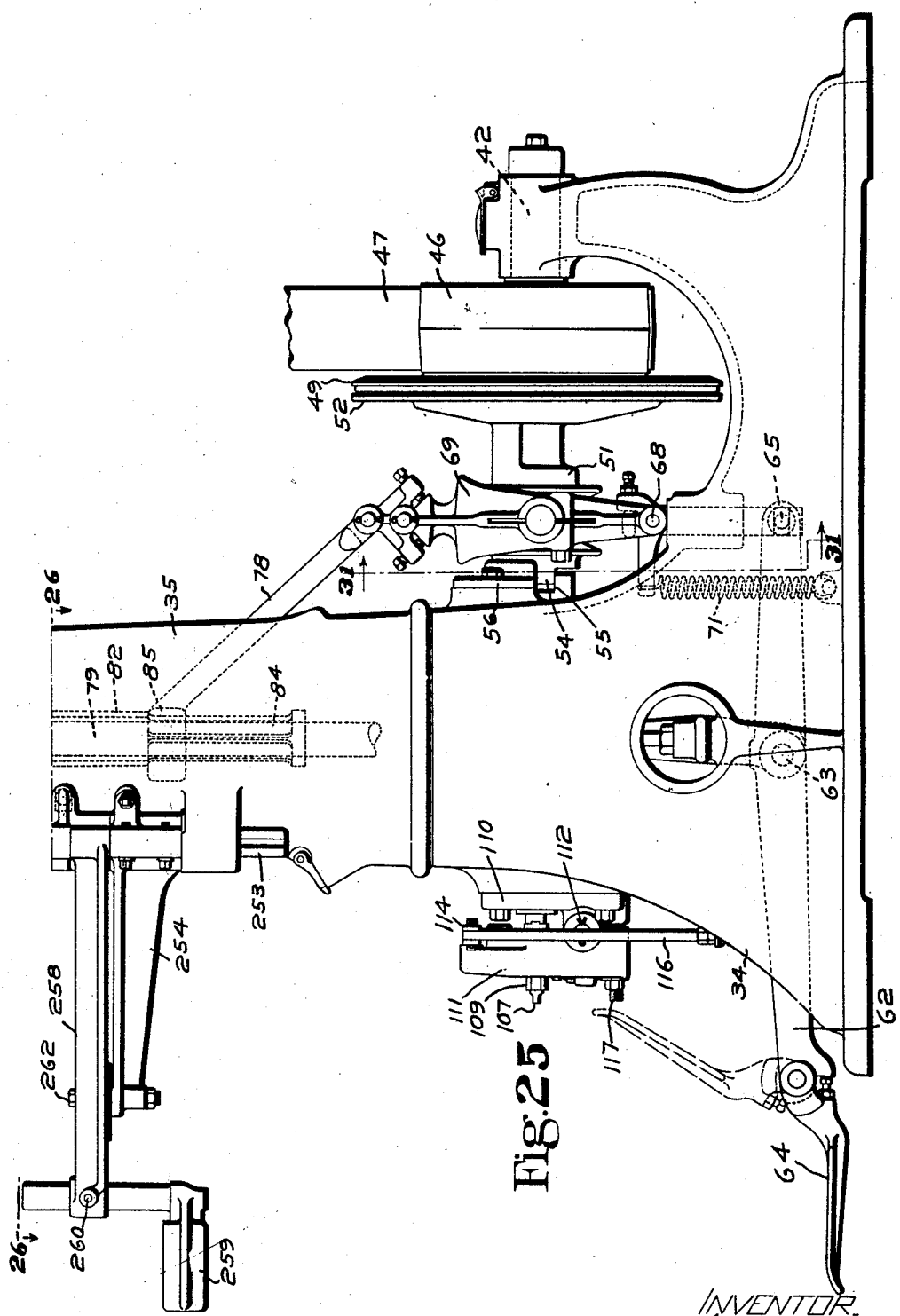

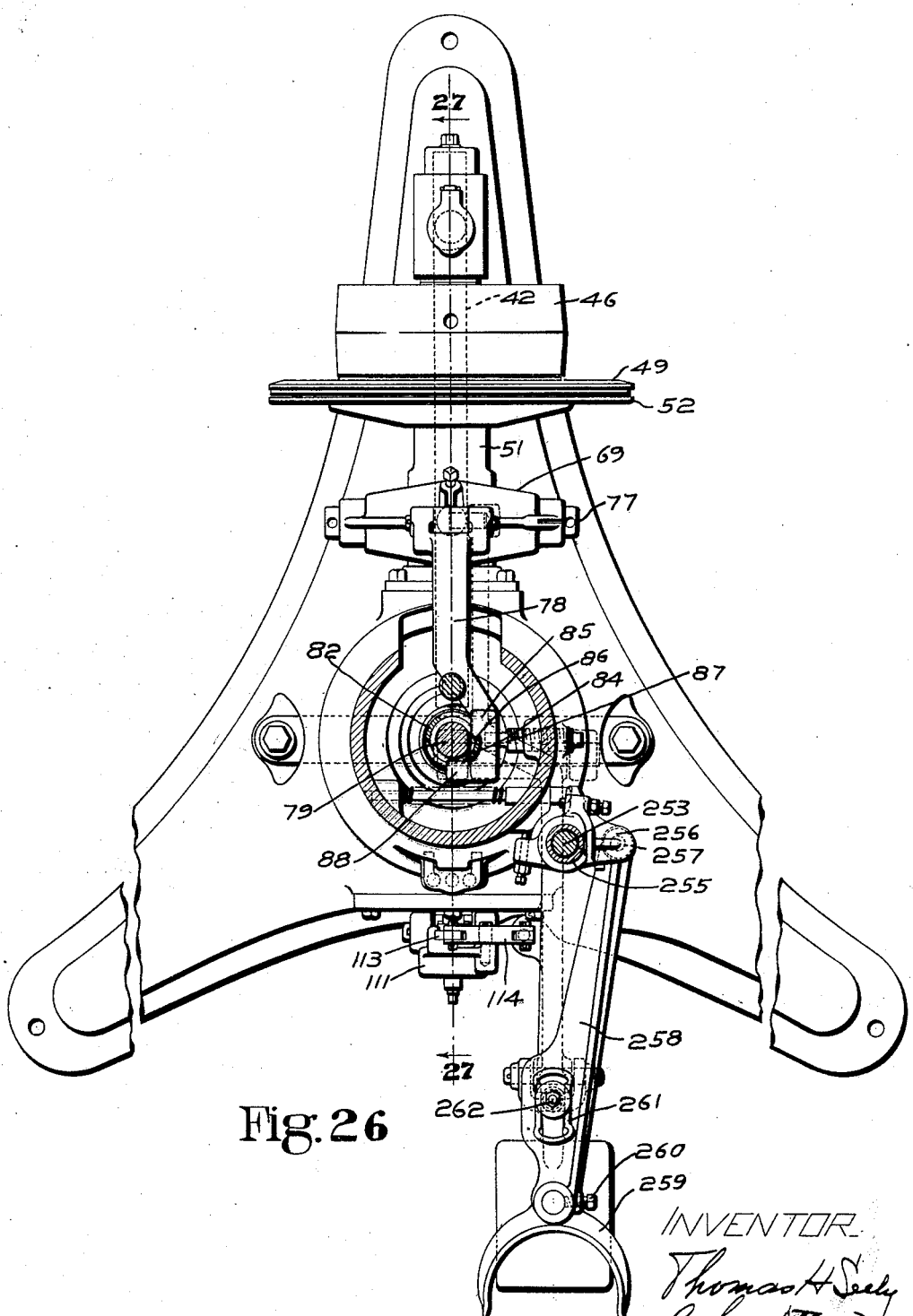

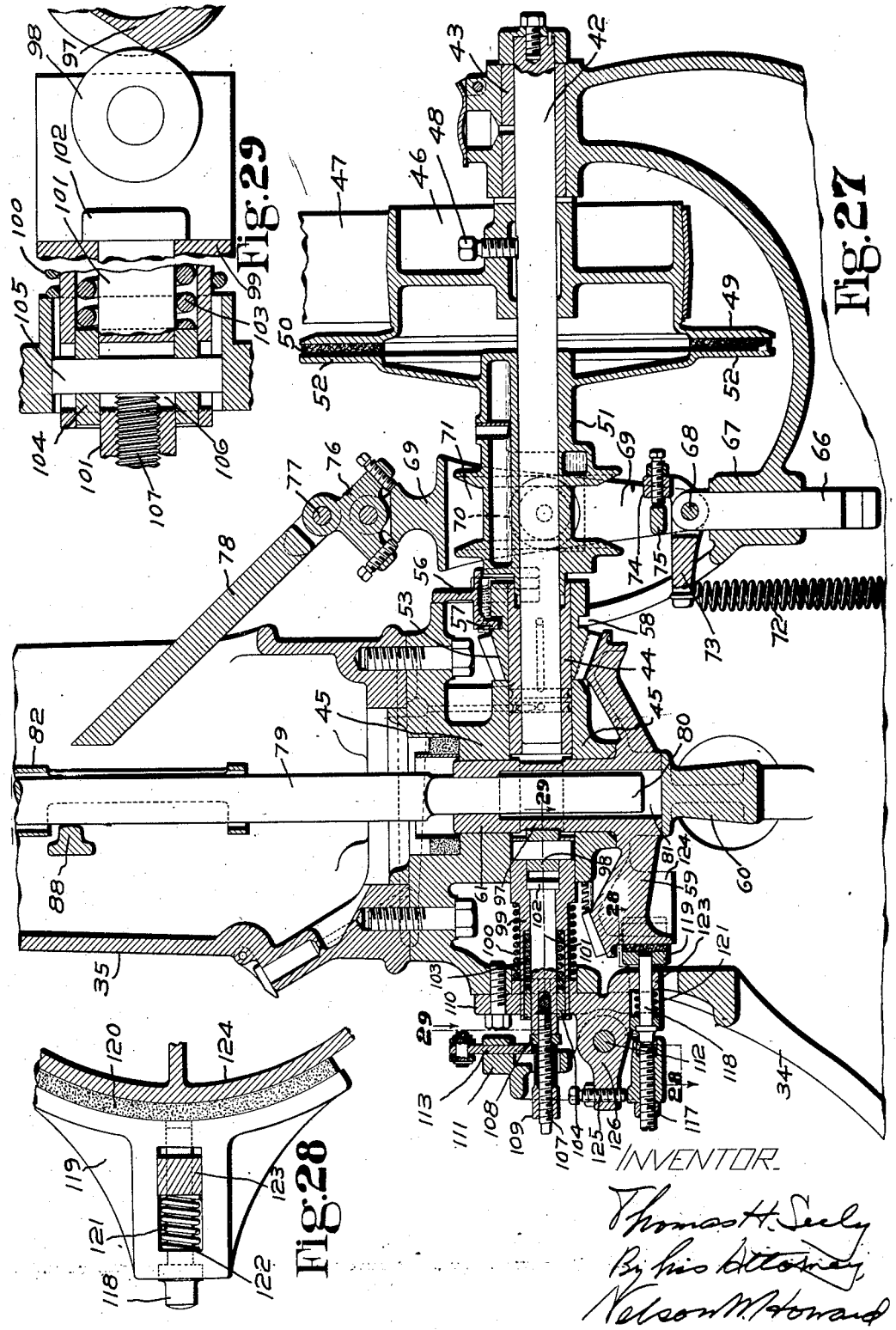

Sept. 23, 1930. T. H. SEELY 1,776,397
MACHINE FOR USE IN THE MANUFACTURE OF BOOTS AND SHOES
Original Filed May 12, 1920 19 Sheets-Sheet 18

Sept. 23, 1930.  T. H. SEELY  1,776,397
MACHINE FOR USE IN THE MANUFACTURE OF BOOTS AND SHOES
Original Filed May 12, 1920   19 Sheets-Sheet 19

INVENTOR
Thomas H. Seely
By his Attorney
Nelson W. Howard

Patented Sept. 23, 1930

1,776,397

UNITED STATES PATENT OFFICE

THOMAS H. SEELY, OF MELROSE, MASSACHUSETTS, ASSIGNOR TO THE UNITED SHOE MACHINERY CORPORATION, OF PATERSON, NEW JERSEY, A CORPORATION OF NEW JERSEY

MACHINE FOR USE IN THE MANUFACTURE OF BOOTS AND SHOES

Application filed May 12, 1920, Serial No. 380,897. Renewed April 19, 1928.

This invention relates to machines employed in the manufacture of boots and shoes, and more particularly to lasting machines for laying the upper materials of a boot or shoe over the bottom of the last or innersole by repeated operations along different portions thereof. Machines of this general type are known as hand method lasting machines, an example of which is disclosed in United States Letters Patent No. 584,744, granted June 15, 1897, on application of Ladd & McFeely.

In lasting machines of the hand method type, a gripper is actuated to grip and pull or updraw the upper materials and to overdraw or lay them over the bottom of the last or innersole; and a wiper is caused to move over the upper materials and wipe or press them into the desired lasted position where they are secured in place by fastenings or tacks. The term "shoe" will be employed hereinafter in its general sense to designate both boots and shoes, and the terms "fastenings" and "tacks" will likewise be employed in the broad sense to designate any character of means that may be driven into or through the upper materials to hold them in lasted position.

In lasting welt or Goodyear shoes, it is now the usual practice to last the sides of the shoe and a portion at or adjacent the breast of the heel on a hand method lasting machine, and subsequently to last the toe and remaining portions at the heel seat on a bed lasting machine. The fastenings or tacks for holding the upper materials in lasted position along the sides of the welt shoe are left upstanding or only partially driven for convenience in subsequent removal. In conforming the upper materials of a welt or Goodyear shoe to the last along the ball and curve leading to the deeply-undercut shank portion at the inner side of the shoe, it is sometimes desirable to plait the upper in order that it may be made to lay smooth and flat over the bottom of the last. In lasting a McKay shoe on the hand method machine, it is the usual practice to last the ends as well as the sides, and to fully drive the fastenings or tacks and clinch them against the metal bottom of the last within the shoe. As part of the lasting means in either case, however, a wiper is employed to take control of the upper and lay it smoothly upon or over the bottom of the last. In the hand method machine for lasting welt or Goodyear shoes, the wiper is usually of a special type, whereas in the hand method machine for lasting McKay shoes, the wiper is usually formed by the under surface of the tack carrier or slide.

The present invention will be described in connection with a hand method lasting machine for lasting McKay shoes, but it is to be understood that it is not restricted to this use, but that certain aspects of the invention may be advantageously employed in other machines, as for instance, those for lasting welt shoes.

Shoemakers recognize that good practice in lasting a shoe on the hand method type of machine requires that the workman shall last each side of the shoe from a point near the tip line at the toe to approximately the breast line of the heel, and then last the ends of the shoe, which in the case of a McKay shoe, is frequently done on the hand method laster. In lasting certain portions of the shoe, where the upper is full, as for instance around the toe, it has been customary to give the gripper a turning and a lateral or side reach movement to plait the upper materials and cause them to lie flat over the bottom of the last or innersole. Each lateral or side reach movement of the gripper in one direction, or at each side of the median line of the shoe, however, has been accompanied by a turning movement of the gripper in one direction, so that the plait at each side of the median line has been invariably laid in accordance with the established relation between the lateral or side reach movement and the turning movement of the gripper in the particular machine.

In some styles of shoes, and in the use of some kinds of upper materials, it is desirable to cause the fullness of the upper to be formed in a plait or by turning movement of the gripper in one direction or the opposite, at the same side of the shoe. The direction in which the gripper is turned during any lateral or side reach movement in one direction, will of course determine the character or direction of the resulting plait in the upper materials, which should be made responsive to either the style of the shoe, or the condition or quality of the materials employed, or the preference of the workman. An important feature of the invention consists in means for moving the gripper laterally and for turning it either to the right or left, as it is moved laterally in one direction.

This feature of the invention is placed under the control of the workman, who may select the character of movements to be imparted to the gripper and conform these movements in the desired relation. The workman control of the turning and lateral or side reach movements of the gripper is preferably exercised through means which may be actuated by the body or leg of the workman without disengaging his hands from the shoe.

When the gripper overdraws the upper either with or without plaiting it, efficient operation requires that the tension applied by the gripper be maintained until control of the upper has been assumed by the wiper. The upstanding edge of the upper, however, varies in length in different shoes, and also in different portions of the same shoe; and the upper materials in some shoes will stretch or give more than in others. The effect of these conditions is that at the end of the overdraw, the gripper will occupy different positions from the edge of the shoe. The gripper, however, must release the upper and retreat from contact by the wiper or tack carrier as the latter moves into contact with and takes control of the overdrawn upper. It has been the practice heretofore to adjust the gripper release in conformity with the requirements of the shortest stock to be overdrawn, or the shortest overdraw movement of the gripper, so that just before the wiper or tack carrier reaches or contacts with the gripper, the latter would release the upper and move inwardly over the bottom of the last under the tension or impulse of the overdraw spring. It has also been proposed to alter or vary the rate of movement of the wiper or tack carrier in accordance with the gripper overdraw, but in such case the time of gripper release remains constant, and the variation in the rate of wiper movement is relied upon to prevent contact of the wiper or tack carrier with the gripper.

A broad feature of the invention consists in effecting the gripper release in accordance with the length of the overdraw. If the overdraw movement is short, the present invention contemplates that the gripper shall release the upper earlier than where the overdraw is of a greater extent. In connection with this feature of the invention, after the time of release of the gripper has been established by the length of the overdraw, a lock secures the parts in position to insure gripper release at the established point in the cycle of the machine operation.

In a hand method lasting machine, it is the usual practice to secure the upper in overdrawn or lasted position by one kind of fastening along one portion of the shoe, and by a different kind of fastening along another portion of the shoe. For instance, in lasting a McKay shoe, relatively short fastenings will be driven permanently into the shoe along the sides while relatively long fastenings will be driven into the shoe at the ends where the thickness of material is greater, due to the plaiting of the upper. When the change of fastenings is made, it has also been the practice to change the kind of gage employed for positioning the shoe. Along the sides and shank a "thin" gage has usually been employed, while at the ends of the shoe a "thick" gage has been employed, and the shift from one kind of tack to the other and from one kind of gage to the other has been made at the will of the workman. To provide the fastenings, it has been customary to use the fastening-supplying means in the form of raceways, and separating mechanism for supplying the desired kind of fastening to a tack carrier or nail block by which the fastening was placed in inserting position. In such cases, however, the first fastening presented to the inserting mechanism after a change of the raceway supply, was of the kind or size previously in use, and consequently not suited to the portion of the shoe presented for treatment. This has rendered it necessary for the workman to run the machine idle or without a shoe for at least one cycle of operation after a change has been made in the kind or size of the fastening to be used, and this has caused loss of fastenings, lack of economy in machine operation, and an accumulation of fastenings on the floor. An important feature of the present invention in this respect consists of pneumatic means for selectively presenting the desired kind or size of fastening to the inserting mechanism on the first operation of the inserting mechanism after a change has been made in the kind or size of fastening to be employed. This feature of the invention is carried into effect by the construction and arrangement of the tack carrier or slide and its selective communication with a compressed air supply for transferring one of a plurality of tacks on the carrier from its supporting to its driving position. The tack carrier, the under surface of which forms the wiper in lasting a McKay shoe, is provided with a driving passage and a plurality of ducts or conduits each leading to the driving passage and each adapted to support or contain a tack ready for delivery to the driving passage, the construction being such that as the tack carrier moves toward the shoe during the operation of the machine, one or the other of the ducts or conduits in the tack carrier is placed in communication with a compressed air supply which impulsively projects the selected tack to driving position in the driving passage.

When the workman finishes one shoe and reaches for another, he usually keeps his foot on the treadle so that the machine continues in operation; and in view of this fact, it has heretofore been proposed to provide a "tack saver" to prevent the discharge of tacks from the machine while the machine is running idle. The present invention includes as a feature thereof, an improved means for effecting the saving of tacks by preventing the delivery of such tacks to the driver when the machine is running idle. An important feature of the invention in this respect consists of a shoe rest which is normally held in position for locating a shoe for the lasting operation and which is adapted to move to another position during the machine operation if no shoe is presented to the machine. By normally holding the shoe rest in its position to properly locate a shoe for the lasting operation, the workman is not called upon to displace the shoe rest as he presents the shoe to the machine, but finds it positioned to facilitate his presentation of a shoe into proper relation with the lasting means. He is thus given more time to present his shoe in proper lasting position, because the shoe rest is not freed to move to its abnormal position, until late in the cycle of the machine operation.

Another important feature of the invention in this respect consists of means for preventing or suspending the tack delivering air current when a shoe is not presented for treatment.

Heretofore the practice has been to operate hand method lasting machines by a belt-driven shaft journalled in the head of the machine. This shaft has either been driven from a driving shaft at the lower part of the machine frame by means of a belt connection or from an overhead or countershaft. In either case, when the head of the machine has been adjusted in height to conveniently locate the lasting means for the individual workman, it has been necessary to cut or piece the belt to shorten or lengthen it. Exposed belts are now the subject of legal restrictions which require that they must be housed or encased to prevent the workman being injured. The present invention obviates the objections heretofore existing when the head of the machine has been adjusted and also overcomes the legal requirements with respect to the protection of belting; and an important feature of the invention in this respect consists of a driving shaft located at the lower or base portion of the machine frame and a housed transmission shaft connected thereto for relative movement as the head of the machine is adjusted, without disturbing the driving connections. The housing for the transmission shaft preferably consists of a hollow supporting column in which is also housed the mechanism for transferring motion from the drive to the transmission shaft.

When the machine has finished the lasting operation on one shoe or a portion thereof, and is stopped preparatory to commencing the lasting operation on another shoe or portion thereof, the gripper should be located or positioned to properly approach and grip the upper when the machine is started. This condition is usually attained through the expertness of the workman, but in the hands of an inexperienced workman, it is difficult to bring the machine to rest at the proper point in its cycle of operation. A feature of the present invention in this respect consists in the combination with lasting means for laying an upper over the bottom of a last of a swinging arm which is actuated by driving means for applying a brake when the treadle is released. The mechanism for the attainment of the stated result comprises a swinging arm, one portion of which is adapted to be temporarily locked or latched to a plunger actuated by a cam on the driving member to apply through another portion of the swinging arm, the braking or stopping force. Since the rotary driving member which is to be stopped and whose rotation effects the application of the brake, is housed or encased within the machine column, the main portions of the automatic stop mechanism are protected and injury to the workman is prevented.

It is frequently desirable to turn the hand method lasting machine by hand. This may be required when some of the machine parts need adjustment or attention for other purposes, or where a partial turn of the machine is desired. In such case, it has been the custom for the workman to take hold of a part of the machine itself, or the power transmission mechanism and apply the necessary force to move the parts. A feature of the present invention consists in the combination with lasting means for laying an upper over the bottom of a last of manually actuated means for operating the machine in addition to the power means, and mechanism controlled by the manually actuated means for rendering the power means ineffectual. A further feature of the invention in this respect consists in the combination with lasting means for laying an upper over the bottom of a last of means for preventing operation of the manual means until after the power-actuated means is rendered ineffectual. The effect of the novel construction with respect to the power and manual operation of the machine is to prevent the power means from being applied to operate the machine while the manual means is being used, and conversely, to prevent the use of the hand-operating means when the power means is being used. This feature of the invention is carried into effect in the present instance through the transmission shaft to which may be applied the actuating force either of the power means or manual means, selectively.

In addition to the above features, the present invention includes other novel features and combinations of parts, all of which will be hereinafter fully described in connection with the accompanying drawings which show one good, mechanical embodiment of the various new features and novel combinations of parts.

In the drawings:—

Fig. 16 is an enlarged detached perspective view of the gripper turning and side reach or laterally moving mechanism;

Fig. 17 is a detached perspective view of details of the gripper overdraw and side reach or laterally moving mechanism;

Fig. 18 is an enlarged detached perspective view of details of the gripper release;

Fig. 19 is a detached perspective view showing details of the tack changing mechanism and associated parts;

Fig. 20 is an enlarged detail of the manually movable pawl in the train of tack changing mechanism;

Fig. 21 is a side elevation of the tack supplying mechanism, the tack separator, and portions of the nail carrier;

Fig. 22 is a plan view in detail of the tack feeding and separating mechanism;

Fig. 23 is an enlarged sectional detail on the line 23—23 of Fig. 21;

Fig. 24 is an enlarged sectional detail on the line 24—24 of Fig. 21;

Fig. 25 is a side elevation of the lower portion of the machine supporting frame looking from the right;

Fig. 26 is a horizontal section on the line 26—26 of Fig. 25;

Fig. 27 is a longitudinal vertical section on the line 27—27 of Fig. 26;

Fig. 28 is an enlarged detail sectional view on the line 28—28 of Fig. 27, showing the construction of the brake of the stopping mechanism;

Fig. 29 is an enlarged section on the broken line 29—29 of Fig. 27, showing the action of the plunger and the cam for applying the brake;

Figure 32:
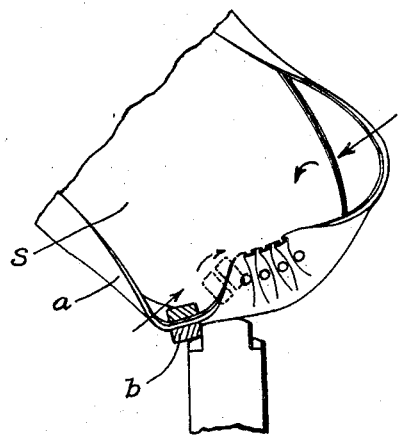
Figure 33:
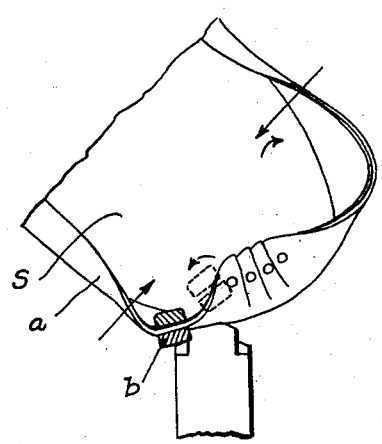

Fig. 32 is a diagrammatic view showing the effect of the turning and the side reach movements of the gripper in forming the plait of the upper about the toe of a shoe by turning movement of the gripper in one direction; and Fig. 33 is a view similar to that of Fig. 32, showing the effect of the plaiting movement of the gripper when turned in the opposite direction at the same side of the shoe or during the same lateral or side reach movement of the gripper as in Fig. 32.

Figure 1:
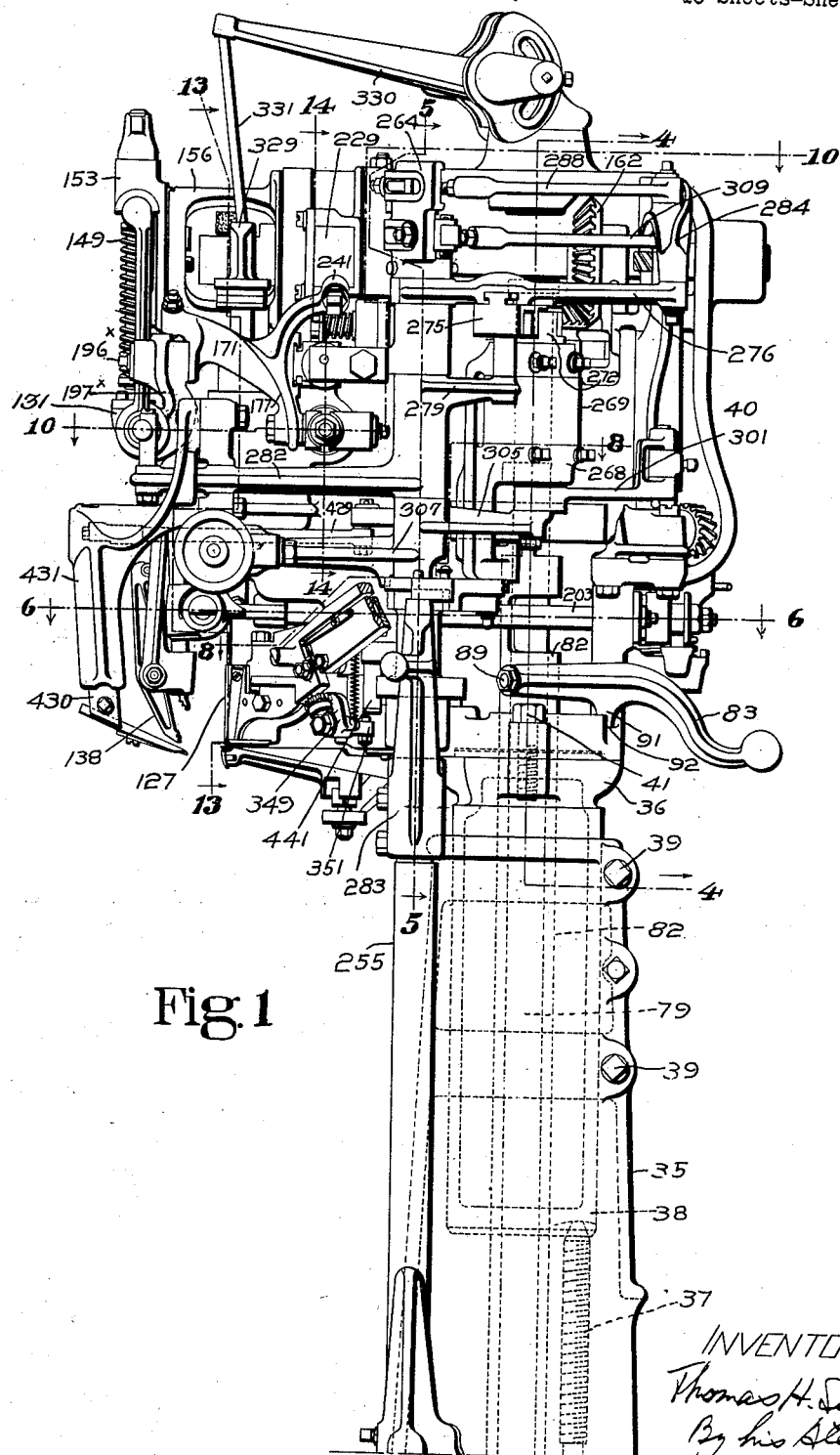
Figure 1 is a side elevation of a hand method lasting machine embodying the present invention and looking from the right side thereof.

The machine frame comprises the base portion 34 from which rises the hollow column 35 into which telescopes the head supporting block 36, Fig. 1, which is adapted to be raised and lowered to suit the height of the workman by means of an adjusting screw 37, Fig. 1, the end of which bears against the lower portion 38 of a sleeve extending downwardly into the column 35 from the head block 36. Clamping screws 39 serve to clamp the head block in adjusted position. The head block 36 serves as a convenient and practical support for the head frame 40 on which the lasting devices are mounted. Clamping screws 41, Fig. 1, serve to rigidly connect the head frame and head block.

The illustrated lasting devices derive their power operation from a driving shaft mounted in the lower part of the machine frame, such driving shaft and its operative connection with the motion-transmitting mechanism being best illustrated in Figs. 25 to 31 inclusive.

Mounted in suitable bearings in the lower or base portion 34 of the machine frame is the driving shaft 42, one end of which finds support in the bearing 43, Fig. 27, while the other end is supported in a bushing 44 mounted within the column or machine frame at 45. The driving shaft 42 has secured thereto the belt pulley 46, which may be driven from a suitable source of power as for instance, by the belt 47, from an overhead or line shaft. The pulley 46 is secured to the driving shaft 42 by the set screw 48 and is provided with a flange 49 faced with a suitable frictional material 50, Fig. 27, and forming one member of a friction clutch. The other member of the friction clutch consists of a sleeve 51 movable endwise on the driving shaft 42 and provided with a flange 52 which may at times be frictionally engaged with the driving pulley. The sleeve 51 is operatively connected to a bevel gear 53 by projections 54 which engage complemental recesses 55, Fig. 25, in the hub of the bevel gear. The bevel gear 53 is rotatably mounted upon the bushing 44 and is held in fixed relation lengthwise of the driving shaft by a holder 56 having a flange 57 engaging a circular groove 58 in the hub of the gear. By reason of the interengagement of the projections 54 and the recesses 55 as described, the sleeve 51 retains its driving connection with the gear 53 regardless of the position of the sleeve longitudinally of the driving shaft 42.

Figure 31:
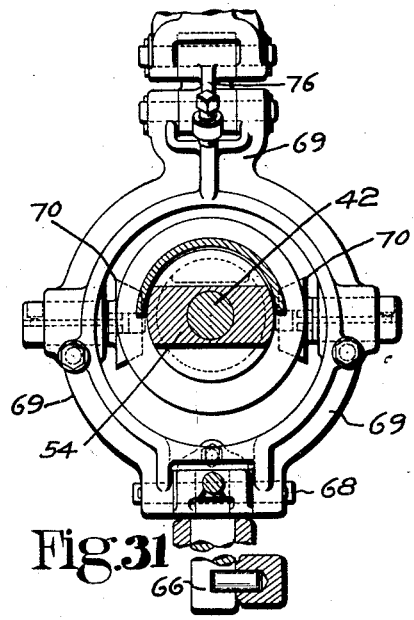
Fig. 31 is a vertical section on the line 31—31 of Fig. 25.
Figure 30:
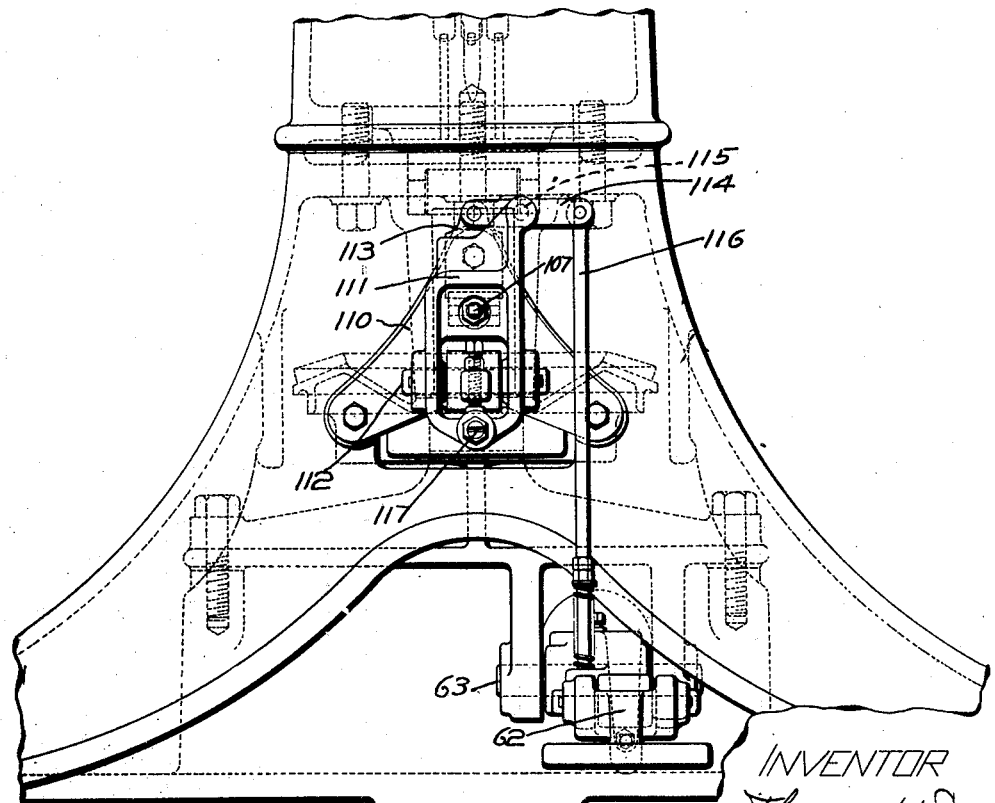
Fig. 30 is a front elevation of the base portion of the machine, showing parts of the stopping mechanism.

Mounted within and housed by the machine supporting frame is a transmission gear 59, Fig. 27, which meshes with the bevel gear 53. The transmission or driving gear 59 rotates to drive, or transmit motion to, the operating mechanism located in the head of the machine. In the present instance the transmission gear 59 is supported by a tie-beam 60 extending crosswise of the machine frame within the hollow base, and the hub portion 61 of the transmission gear finds lateral support in the bearings 45. A treadle 62, Fig. 25, is pivotally mounted on the base of the machine frame at 63, and is provided with a foot-piece 64. The other end of the treadle 62 is connected at 65 with a sliding rod 66 which is movable in a guideway 67 and has connected at its upper end at 68, a swinging yoke 69. The yoke 69, as best indicated in Fig. 31, carries rollers 70 which engage a circular groove or track 71 formed on the sleeve 51. A spring 72 normally acts to hold the rod 66 and perforce, the yoke 69 in its lowered position, Fig. 27. In the illustrated machine, the spring 72 has one end attached to a lever arm 73 and the other end to a fixed part in the machine base. The other arm 74 of the lever has an adjusting screw which normally bears upon an abutment 75 formed on the yoke 69. The yoke 69 has adjustably connected to its upper end a block 76, Fig. 27, to which is pivotally connected at 77 a strut 78, the construction being such that should the upper end of the strut 78 be held from bodily movement to the left, Fig. 27, and the treadle be depressed, the yoke 69 will swing about its pivotal connection 68 with the rod 66 and effect engagement of the clutch members, and hence power actuation of the driving shaft 42; but should the upper end of the strut 78 be permitted bodily movement, to the left, Fig. 27, when the treadle is depressed, the yoke 69 would not be swung to effect engagement of the clutch members.

Housed by and extending upwardly within the column 35 of the machine frame is a transmission shaft 79, the lower end portion 80 of which is formed non-circular in cross section and telescopes within a correspondingly-shaped opening 81 formed in the hub of the transmission gear 59.

Loosely mounted upon the transmission shaft 79 is a sleeve 82, Figs. 1, 25, 26 and 27. The sleeve 82 is capable of endwise and turning movement on the transmission shaft 79 by a hand-piece 83 constituting the manually-operating element for turning the machine by hand.

The lower end portion of the sleeve 82 is provided with an abutment 84, Fig. 25, which may be conveniently formed by slotting the sleeve 82 longitudinally. The upper end portion of the strut 78 is provided with a head 85 which has a shoulder 86 best shown in Fig. 26, adapted to rest against the abutment 84 of the sleeve and is held against vertical movement and guided for lateral movement relative to the vertical axis of the shaft 79 by a pin 87 extending through the machine column. When the sleeve 82 is in the position as indicated in Fig. 26, the shoulder 86 of the strut bears against the abutment 84 of the sleeve; and if the treadle be depressed with the parts in this position, the yoke 69 will be moved laterally to effect engagement of the clutch members. If, however, the sleeve 82 be turned backwardly, Fig. 26, or clockwise, by the hand-piece 83 as hereinbefore described, the abutment 84 of the sleeve will be moved backwardly from the shoulder 86 of the strut and free the upper end or head portion 85 of the strut to backward or lateral movement such that should the treadle be depressed, the upward movement of the yoke 69 will cause lateral movement of the upper head portion 85 of the strut without placing the clutch members in operative relation. To insure such lateral or backward movement of the head 85 of the strut when the sleeve 84 is turned clockwise, viewing Fig. 6, the head 85 has a portion 88, Fig. 26, which is adapted to be engaged by the abutment 84 of the sleeve and positively moved to carry the upper end of the strut 78 backwardly as the sleeve is rocked on the transmission shaft. This insures that the power operation of the machine, by depression of the treadle, shall be rendered impossible when the sleeve 82 is rocked in the manner described, by the hand-piece 83.

Figures 6, 7:
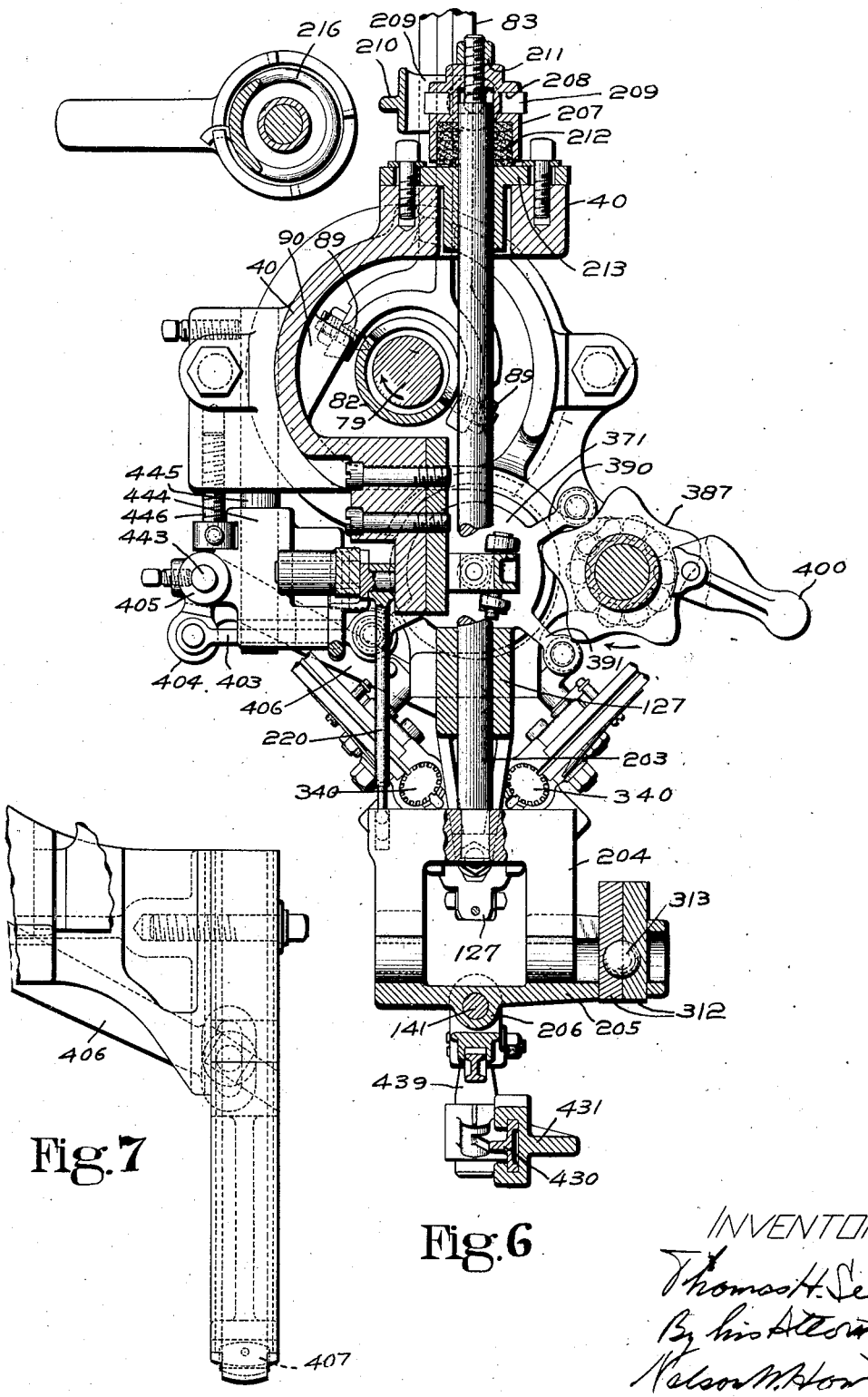
Fig. 6 is a horizontal section on the line 6—6 of Figs. 1 and 2.
Fig. 7 is an enlarged detached detail of the thin and thick edge gages and their associated elements.
Figure 11:
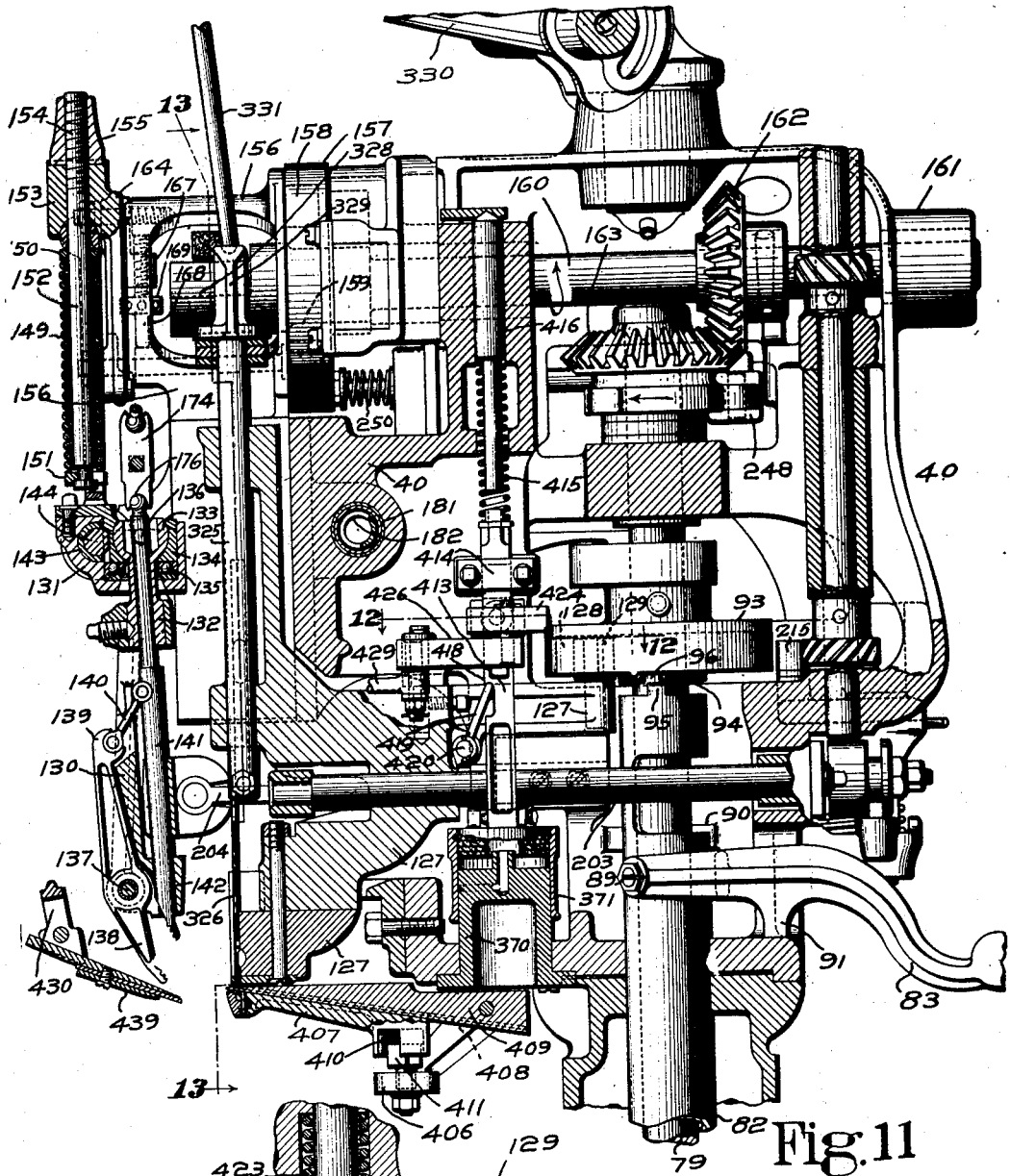
Fig. 11 is a longitudinal vertical section on the line 11—11 of Fig. 3.

It is convenient at this point to describe the means provided for effecting the hand or manual operation of the machine, and the interdependence of such means and the power-operated means; and attention is directed to Figs. 1, 6, and 11.

The hand-piece 83 has a bifurcated end portion pivotally connected at 89 to the sleeve 82, and projecting from the head frame 40 of the machine is a locking ledge 90 under which one member of the bifurcated end portion of the hand-piece 83 extends when the machine is being operated by power (see Fig. 6), and a lug 91 on the hand-piece 83, Figs. 1 and 11, at such time is engaged with a locking recess 92, Fig. 1, the construction being such that when the machine is being operated by power, or is capable of being so operated the abutment 84 of the sleeve 82 is positioned as indicated in Fig. 26 to prevent lateral movement of the head of the strut 78, and the hand-piece cannot be accidentally or otherwise manipulated to effect hand operation of the lasting means because the ledge 90 overlies one arm of the bifurcated end portion of the hand-piece 83 and prevents movement of the hand-piece about the lug 91 as a fulcrum to raise the sleeve 82. Secured to the transmission shaft 79 is a transmission cam 93, the hub portion 94 of which, Fig. 11, is provided with one or more recesses 96 adapted to be engaged by a projection 95 on the sleeve 82 when such sleeve is preliminarily rocked by the hand-piece 83 to bring the projection 95 into register with or opposite to one of the recesses 96. Assuming the parts to be positioned for power operation of the machine as indicated in Figs. 11 and 26, if it be desired to operate the machine manually, the hand-piece 83 is first lifted to disengage the lug 91 of the hand-piece from the locking recess 92, whereupon the hand-piece and sleeve 82 may be preliminarily moved about the transmission shaft 79 to bring a lug 95 of the sleeve opposite one of the notches 96 of the transmission cam. This movement of the hand-piece rocks the sleeve 82 to carry the abutment 84 at the lower end of the sleeve from the shoulder 86 of the head 85 at the upper end of the strut 78, and causes the head to be moved laterally, thus throwing the power-actuating means out of commission, even though the treadle be depressed. By this same movement the arm of the bifurcated end portion of the hand-piece is brought into position to clear the ledge 90 when moved vertically. The outer end of the hand-piece may then be depressed to raise the sleeve 82 to engage the transmission cam and then the hand-piece may be further manipulated to turn the transmission cam, and perforce, the lasting means for operating the machine by hand. Conversely, when it is desired to operate the machine by power, after it has been operated manually, the outer end of the hand-piece is allowed to rise, thus disengaging the sleeve from the transmission cam, and then is moved laterally to place the lug 91 in the locking recess 92, whereupon the sleeve 82 is caused to rotate counterclockwise, Fig. 26, to place the abutment 84 of the sleeve against the shoulder 86 of the strut head. If the treadle be then depressed, the machine may be power driven. The radius of turning movement of the hand-piece 83 when operating the machine manually, is preferably about one-fifth of a circle; consequently, to turn the machine one revolution by hand, the hand-piece is required to be manipulated five times. This is a convenient arrangement of the parts, but of course the invention is not restricted in this respect, and the radius of movement may be larger or smaller, as circumstances may dictate.

When the machine is to be stopped, it is desirable that it be brought to rest with the gripper and and lasting devices in position ready for commencing another cycle of the machine operations, that is, with the tack slide or wiper in its retracted position and the gripper open, ready to approach and clamp the upper. The mechanism provided by the present invention for accomplishing this result is best illustrated in Figs. 25, 27, 28, 29 and 30. The transmission gear 59 housed within the machine column is provided with a cam 97 formed on the hub 61 of the transmission gear, upon which rides a roller 98 carried by a plunger 99 extending through the supporting column and guided for reciprocating movement. A spring 100 normally maintains the plunger 99 with the roller 98 in contact with the cam, but permits reciprocation of the plunger during rotary movement of the transmission gear. Mounted in the plunger 99 is a second plunger or catch carrier 101 having a head 102 normally pressed outwardly into contact with a shoulder on the plunger by a spring 103 which bears at its outer end against a collar 104 through which passes a pin 105. The plunger 101 has a slot 106 and an adjustable screw 107 is threaded into the plunger 101, the end of the screw being adapted to bear against the pin 105 under the stress of the inner spring 103 which acts upon the collar 104 and consequently normally forces the pin 105 along with the collar so that the pin bears against the end of the adjusting screw 107. The adjusting screw 107 carries a washer or collar 108, Fig. 27, held in place by a lock nut 109 on the screw 107, the construction being such that by manipulation of the lock nut 109 and screw 107, the tension of the spring 103 may be varied. The spring 103 is the yielding element through which the outward movement of the plunger 97 is transmitted to the brake, and the adjustment referred-to enables the pressure of the brake to be regulated at will and to be yieldingly applied, as will presently appear.

Mounted on a bracket 110, Fig. 27, secured to the lower portion of the machine frame, is a swinging or brake-applying arm 111 which is pivoted at 112 to the bracket. The swinging arm 111 carries a latch 113 connected to an arm 114 which is mounted at 115, Fig. 30, on the swinging arm 111. The outer end of the rocker arm 114 is connected to the treadle 62 by a link 116, the construction being such that when the treadle is released, the latch 113 will be moved into the path of the collar or catch 108 and transmit the yielding outward movement of the plunger to the swinging arm 111. The lower portion of the arm 111 is provided with an adjusting screw 117, Fig. 27, which normally bears against the head of a brake pin 118. The brake pin 118 is carried by a brake shoe 119 which may be faced with friction material 120, and a spring 121 is interposed between a shoulder 122 of the brake shoe and a fixed portion 123 of the machine frame to normally move the brake shoe into its non-braking position or outwardly. The transmission gear 59 carries a flange 124, Figs. 27 and 28, to receive the braking impact of the brake shoe. An adjusting screw 125 extending through a lug 126 formed on the bracket 110 limits the swinging movement of the swing frame 111 to the right, or clockwise viewing Fig. 27, under the outward impulse of the spring 121. From the construction described it will be apparent that when the treadle 62 is released, to stop the power operation of the machine, the latch 113 will be moved into the path of the collar or catch 108 on the plunger, and as the plunger is moved outwardly by the cam 97 on the hub of the transmission gear 59, it will act yieldingly to apply the brake and effect stoppage of the machine in a predetermined position, preferably with the gripper raised and open ready to advance and grasp the upper.

It will be apparent, from the construction above described, that, when the hand piece 83 is manipulated to release the abutment 84 from the strut 78, the treadle can be depressed without affecting the clutch or effecting power operation of the machine, and that such depression will act to release the latch 113 which holds the brake applying arm 111 in brake applying position and allow the spring 121 to retract the brake shoe 119 so that the machine can be readily turned over by hand.

The novel features embodied in the starting and stopping mechanism above described are not claimed herein, since they form the subject-matter of, and are claimed in, my copending divisional application Serial No. 417,474, filed December 30, 1929.

Mounted upon the head frame 40 for movement toward and from the front of the machine, is a tack carrier slide 127, Figs. 2, 6, 8, 11, 13 and 14. Reciprocating movement is imparted to the tack carrier slide by the transmission cam 93, a cam groove 128 of which, Figs. 4 and 11, engages a roll 129 extending from the tack carrier slide. Novel features of the tack carrier slide will later be described.

The gripper, Fig. 11, comprises a gripper bar 130 which is suspended from a gripper carrier 131 by a connection which permits turning and lateral or side reach movements to be imparted to the gripper. In the illustrated machine, the gripper bar is secured to a sleeve 132 depending from a ball head 133 which is seated in a rotary block 134, Figs. 10 and 11. The rotary block 134 rests upon ball bearings 135 mounted on the gripper carrier. The ball head 133 and the block 134 are connected for rotary movement about an axis passing vertically through the block 134 by means of metal balls 136, Figs. 10 and 11, which engage slots formed respectively in the ball head 133 and in the block 134, the construction being such that while the ball head 133 may have universal movement in the block 134, rotary movement of the block 134 about its vertical axis will be transmitted to the ball head 133 and its connected sleeve 132.

Pivotally mounted on the gripper bar 130 at 137, Fig. 11, is a gripper jaw 138, the upper end portion 139 of which is connected by a link 140 to another jaw member 141 which is mounted for longitudinal movement in a bearing 142 at the lower end of the gripper bar and through the sleeve 132, the construction being such that longitudinal movement of the gripper 141 will cause the gripper jaws to seize and release the upper, as will more fully appear.

Figure 10:
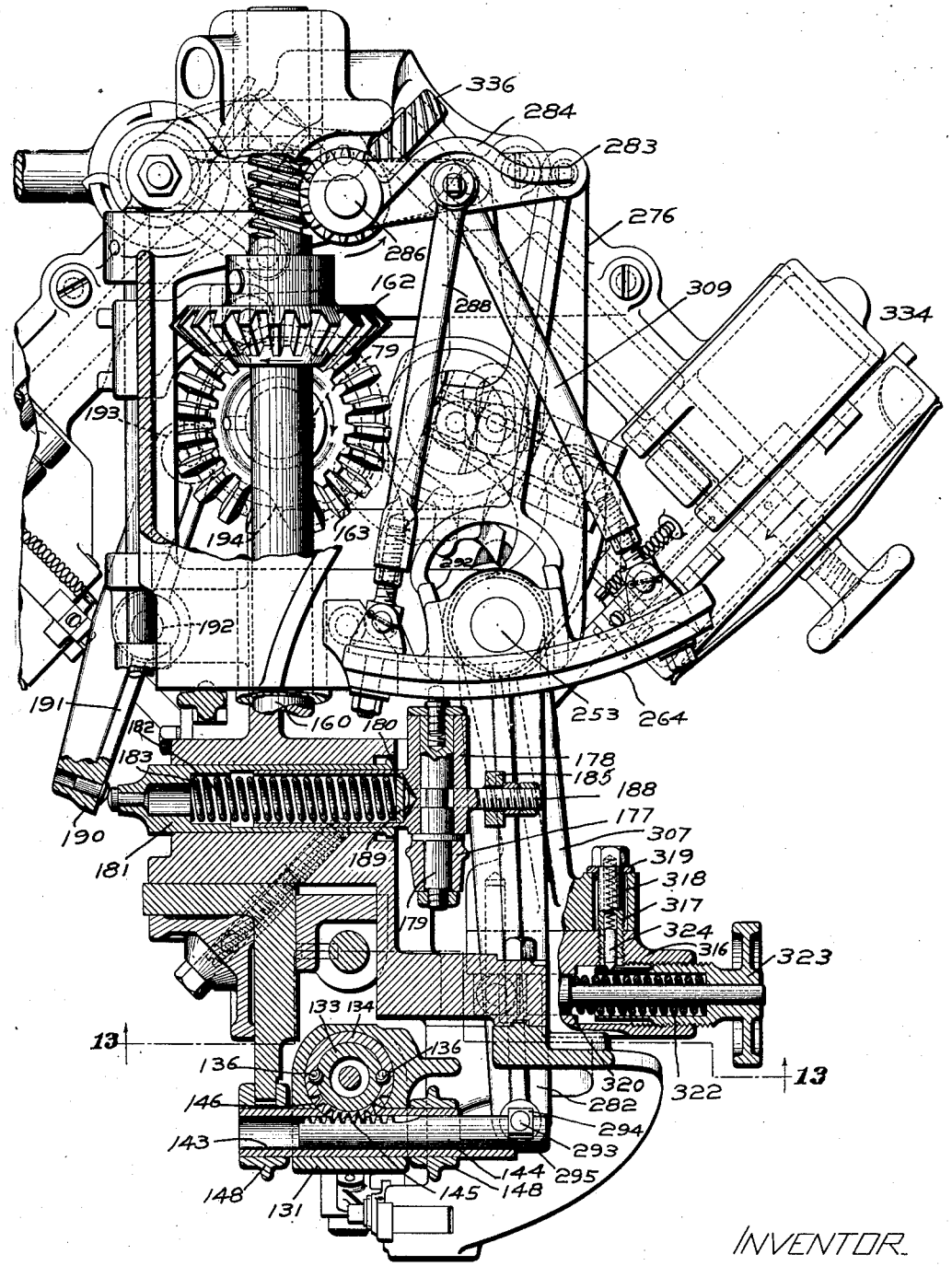
Fig. 10 is a horizontal section on the broken line 10—10 of Fig. 1, the parts being shown on an enlarged scale.

Extending laterally through the gripper carrier 131 is a sleeve 143, Fig. 10, in which is mounted a rack bar 144 having teeth 145 which engage corresponding teeth 146 formed on the rotary block 134, the construction being such that by endwise movement of the rack 144, the gripper may be given a turning movement either to the right or left, as will more fully appear.

Figure 3:
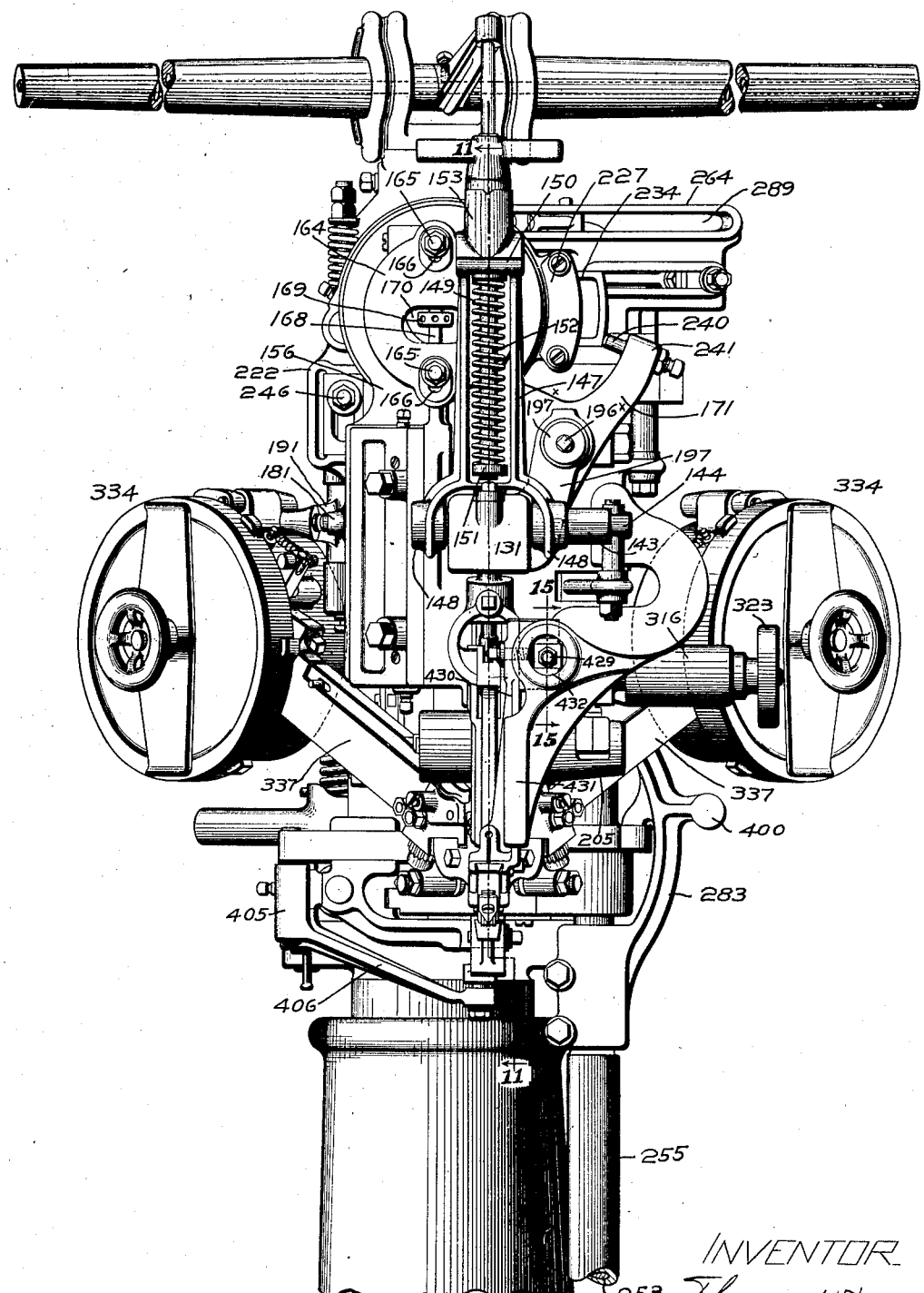
Fig. 3 is an enlarged front elevation of the upper portion of the machine.

The gripper carrier 131 is connected to the gripper updraw which comprises a hanger 147, Fig. 3, having bifurcated lower end portions which, at 148, Figs. 3 and 10, embrace the laterally-extending sleeve 143 in the gripper carrier. The hanger 147 is yieldingly supported by a spring 149, one end of which rests against the upper end 150 of the hanger, Fig. 3, and the lower end against a collar 151 carried by a rod or stem 152 adjustably secured to an updraw head 153, Figs. 3 and 11. The rod or stem 152 passes upwardly through the updraw head 153 and is provided with screw threads 154 which are engaged by an adjusting nut 155, the construction being such that by manipulation of the nut 155, the updraw tension of the spring 149 may be varied at will.

Figure 2:
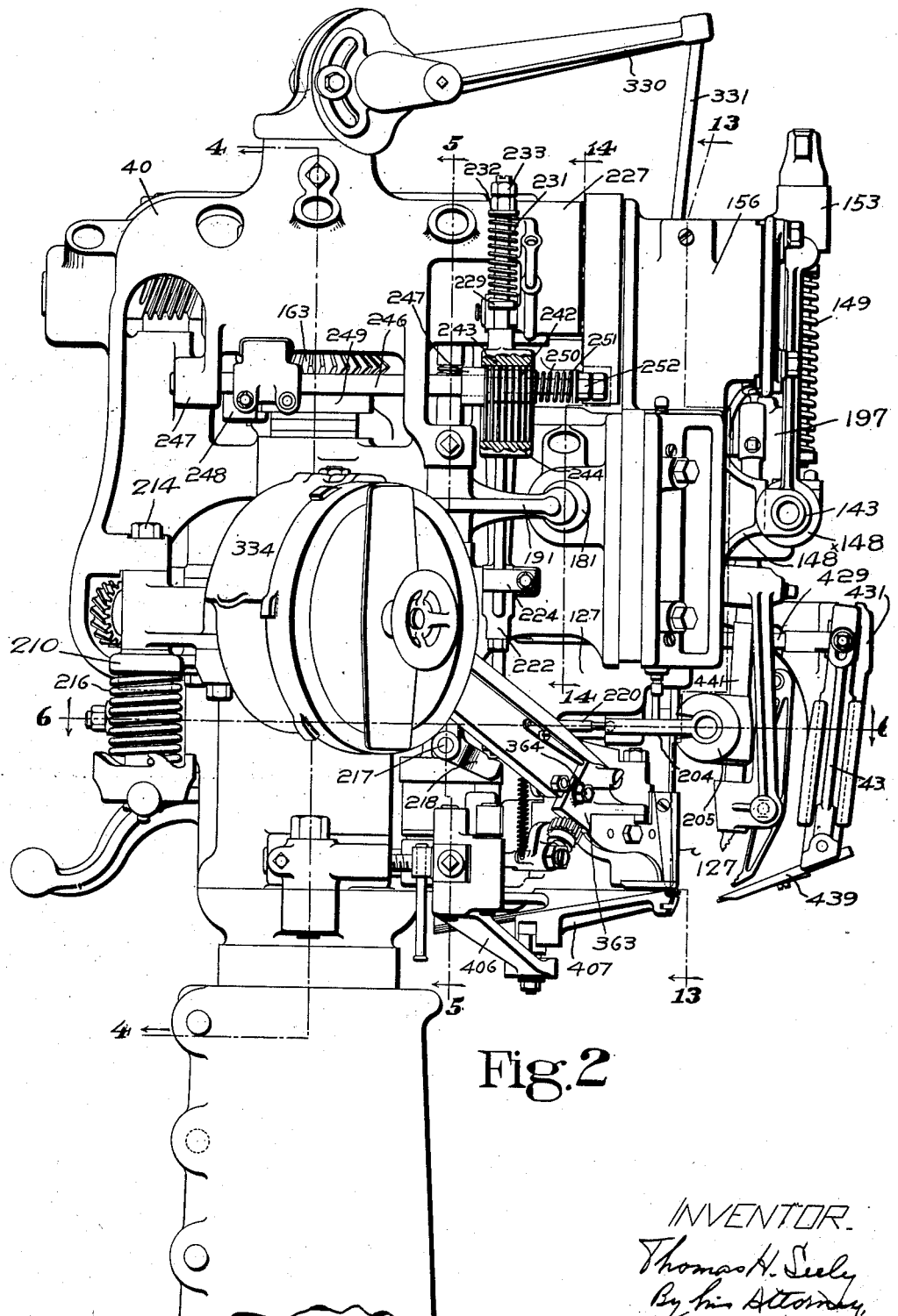
Fig. 2 is an enlarged side elevation, mainly of the head portion of the machine, looking from the left side thereof.

The updraw head 153 is adjustably connected to an updraw slide 156, Figs. 2 and 3, which is given its updraw movement through a cam 157 having a trackway 158 in which runs a roll 159, Fig. 11, extending from the slide 156. The cam 157 is carried by a cam shaft 160 which extends from the front to the rear of the machine, as best indicated by Fig. 11, and is supported in suitable bearings 161 on the head frame. The cam shaft 160 is provided with a bevel gear 162, Fig. 11, which is engaged with a correspondingly bevelled gear 163 secured to the transmission shaft 79 hereinbefore described, the construction being such that upon rotation of the transmission shaft, rotary movement will be imparted to the cam shaft and transmitted through the means described, to the slide 156 and the gripper updraw head.

The adjustable connection between the updraw head 153 and the slide 156 may be variously arranged, but in the illustrated machine, the updraw head 153 is formed as part of or is integral with a plate 164, Figs. 3 and 11, which is adjustably connected to the slide 156 by bolts 165 passing through the slots 166 in the plate 164. By loosening the bolts 165, the plate 164, and consequently the updraw head 153, may be adjusted upwardly or downwardly, as the occasion may suggest. As a convenient form or means for accomplishing the adjustment, however, the plate 164 has extending from its rear surface a threaded block 167, best shown in Fig. 11, through which is threaded an adjusting screw 168 which is held at its ends in suitable bearings formed on the slide 156. The adjusting screw 168 is provided with a capstan head 169 by which the screw may be turned when the bolts 165 are loosened, and by which the updraw head 153 may be conveniently adjusted. To permit access to the capstan head 169 from the front of the machine, the plate 164 is provided with an opening 170, Fig. 3.

The gripper is caused to grasp and release the upper during the operation of the machine, and the means for accomplishing these purposes, in the present invention, contain novel features which will now be explained.

A gripper releasing and closing lever 171, best shown in Figs. 1, 3, 13, 14 and 18, is mounted for rocking movement about an axis 172, and has an arm 173 extending laterally from the pivotal axis, as indicated in Fig. 18. To the arm 173 is connected a link 174, the connection being preferably formed by a ball and socket joint 175, as best indicated in Fig. 18. The lower end of the link 174, as indicated in Fig. 11, has a ball and socket joint connection at 176 with the upper end of the gripper jaw 141, the construction being such that a thrust or pull upon the link 174 will close or open the gripper.

Closing movement of the gripper is accomplished through yielding cam-actuated means in order to give the gripper capacity for handling different thicknesses of stock. The gripper release and closing lever 171 has a downwardly-extending arm 177, Figs. 10, 13, 14 and 18, which carries a sleeve 178, the connection between the sleeve and arm 177 being preferably effected by a bolt 179, Figs. 10 and 18. The sleeve 178 has a tubular side extension 180 which telescopes into a transversely-movable plunger 181, Fig. 10, within which is a spring 182, one end of which is seated against one end of the plunger at 183, and the other end acts expansively against the sleeve 178. Means are provided for adjusting the tension or expansion qualities of the spring 182. As illustrated herein, the sleeve 178 is slotted transversely to form a guideway through which extend arms 184 of an adjusting sleeve 185, Figs. 10, 14 and 18. The outer end 186 of the adjusting sleeve rests against adjusting nuts 187 threaded to a stem 188 extending from the sleeve 178, and the inner ends of the arms 184 on the adjusting sleeve 185 engage a disk 189 against which the spring 182 abuts. By manipulation of the adjusting nuts 187 the adjusting sleeve 185 may be moved more or less to vary the tension of the spring 182 and thus determine the yielding character of grip that shall be imparted to the gripper, as will presently appear.

The end of the plunger 181, Fig. 10, rests against the end 190 of a gripper closing lever 191 pivoted at 192 to the machine frame, Fig. 10, and having a roll 193 which travels on a gripper closing cam 194 secured to the transmission shaft 79. Movement of the gripper closing lever 191 in a direction to compress the spring 182, or counterclockwise viewing Fig. 10, will cause the gripper release and closing lever 171 to be turned about its axis 172 and effect downward movement of the gripper jaw 141 to close the gripper. Movement of the gripper releasing and closing lever 171 in the opposite direction will of course effect gripper release or the opening of the gripper, as will more fully appear.

The gripper release and closing lever 171 has an arm 195 which has projecting from it a pin 196. The pin 196 is connected to the gripper carrier by a screw $196^x$ and a washer $197^x$ as best indicated in Figs. 1 and 3, wherein the gripper carrier 131 is shown as provided with an upwardly and laterally-extending arm 197 through which extends the pin 196.

When the gripper is raised or updrawn, the gripper carrier 131 of course rises and with it rises the arm 197, just described, so that the gripper releasing and closing lever 171 is caused to rock about the axis of the plunger 181 as a center, or as indicated in Fig. 18, about the axis of the adjusting bolt 188 as a center. This rocking movement of the lever 171 is permitted because, during such movement, the gripper carrier 131 can turn on the sleeve 143, Fig. 11. The gripper carrier is guided for vertical movement by a projection 148×, Figs. 2 and 10, having a vertical edge which engages a slot in the lower end portion 148 of the hanger 147. Outward swinging movement of the gripper carrier is prevented by the lever 171, one point of which is fixed on the axis of the plunger 181 as a center and the pin 196 of which is held by the screw 196× and washer 197× to the arm 197 of the gripper carrier. During the updraw movement of the gripper, the gripper releasing and closing lever 171 will cause a binding action unless such lever is arranged to respond to the updraw movement. In the present invention, the axis 172 of the gripper releasing and closing lever 171 is formed by a pin which extends into a block 198, Fig. 18, mounted in a slot 199 formed in a part connected to the machine frame, so that the block 198 may move in the slot as the updraw movement of the gripper takes place. To further relieve any resistance to the updraw movement by the gripper releasing and closing lever, there is interposed between the block 198, Figs. 14 and 18, an anti-friction ring 200. The ring 200 carries anti-friction balls 201, Fig. 14, and through the central opening of the ring extends a pin 202 to limit its movement under the action of the updraw. This construction obviates the retarding effect of the stock-gripping pressure upon the spring-imparted updraw movement noticeable in hand method lasting machines.

The stock about the sole edge of a shoe presented to the lasting machine varies in length in different shoes, and also in diferent parts of the upper in the same shoe. Some kinds of stock or upper material are more yielding or elastic than others. Consequently, the amount of overdraw of the gripper will vary in accordance with the above-stated conditions. In lasting a McKay shoe by the hand method machine, the lower surface of the tack carrier acts as a wiper to wipe the upper over the last bottom and hold it in place when the gripper releases the upper and retreats over the bottom of the last. It is important that the tension produced in the stock by the updraw and overdraw movement of the gripper be maintained until the fastening or tack is driven to hold the upper in lasted position. This result is accomplished in the present invention by causing the gripper release to be dependent upon the length of the overdraw, and this feature of the invention will now be described.

Mounted for movement toward and from the front of the machine is an overdraw rod 203, Figs. 6, 11 and 17, the front end of which carries a yoke 204 on which is mounted a transversely-movable sleeve 205, Fig. 17. The sleeve 205 is confined to lateral or sidewise movement on the yoke 204, as indicated in Fig. 17, and has a boss 206 through which passes the gripper jaw carrying member 141. The gripper jaw is thus movable with the overdraw rod forwardly and rearwardly, and is laterally movable with respect thereto under the control of mechanism to be hereinafter described.

The overdraw rod 203 is normally under the influence of a spring tending to move it forwardly, from which position it is retracted periodically by a cam-operated arm. The rear end of the overdraw rod is provided with a sleeve 207 shown in Figs. 4 and 6, which is provided with a groove 208 in operative engagement with the end 209 of a retracting arm 210. The sleeve 207 is connected adjustably to the end of the overdraw rod 203 by a nut 211, Fig. 6, and has cushion means 212 interposed between the sleeve 207 and bearing 213 carried by the head frame 40. The arm 210 is pivotally mounted to the machine frame at 214, Fig. 4, and carries a roller 215 which bears against the periphery of the cam 93, the construction being such that the arm 210 will, in response to the cam 93, withdraw or move backwardly the overdraw rod 203 against the tension of a spring 216, Figs. 4 and 6, and will permit the spring 216 to move the overdraw rod forwardly or toward the front of the machine to overdraw the upper.

Figure 14:
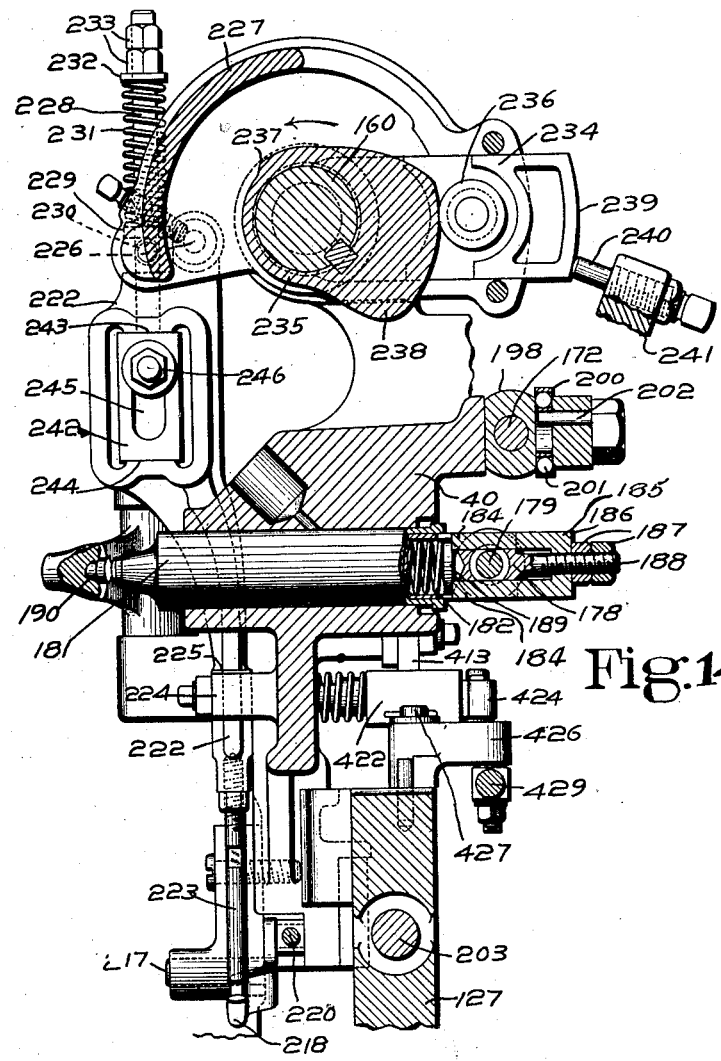
Fig. 14 is an enlarged vertical section on the line 14—14 of Figs. 1 and 2.

Pivotally mounted to the head frame 40 at 217, Figs. 2 and 17, is a bell crank lever 218 which is connected at 219 to a rod 220 which extends into a recess 221 in the overdraw yoke 204. Mounted for vertical movement on the head frame 40 is an overdraw measuring arm 222, Figs. 2 and 14, the lower end of the arm being provided with an adjustable rod 223, Fig. 14, the lower end of which is in the path of movement of the bell crank lever 218. The measuring rod 222 may be appropriately guided in the head frame by a suitable bearing as at 224, Fig. 14, and a stop collar 225 may be provided to limit the downward movement of the measuring rod when, after the overdraw, the overdraw yoke is moved further inwardly upon the gripper release, to carry the gripper inwardly over the bottom of the shoe. At its upper end the measuring rod 222, Fig. 14, is pivotally connected at 226 to a frame 227 mounted for rocking movement about the axis of the cam shaft 160. A rod 228, Fig. 14, is secured to and extends upwardly from the measuring rod 222 and carries a collar 229 which rests upon a projection or roll 230 extending from the frame 227 at a greater distance from the axis of the cam shaft 160 than the pivotal connection 226 of the measuring rod with said frame. The rod 228 carries a spring 231, the lower end of which rests upon the collar 229 and the upper end of which bears against an adjustable collar 232, the adjustment of the collar 232 being conveniently formed by the threaded end of the rod 228 and adjusting nuts 233. As thus far described, it will be apparent that when the measuring rod 222 is free to move downwardly, it will turn the frame 227 about the axis of the cam shaft 160 until its descent is stopped.

The frame 227 carries a gripper release actuator 234, Fig. 14, which is capable of a sliding movement on the frame 227 toward and from the axis of the cam shaft. Secured to the cam shaft 160 is a gripper release and opening cam 235, Fig. 14, adapted to engage a roller 236 carried by the gripper release actuator 234. The gripper release and opening cam has a riser 237 which, when it engages the roller 236 effects the gripper release through a train of mechanism to be presently described. This cam also carries a gripper opening portion 238 which acts through the train of mechanism to fully open the grippers after the upper has been released and to position them in such open position for taking another hold or grip of the upper.

The gripper release actuator 234 has a widened portion 239, best shown by Fig. 18, which is adapted to engage an adjusting pin 240 carried by an upwardly-extending arm 241 of the gripper releasing and closing lever and effect movement of said lever about its axis 172. During the updraw movement, the lever 171, Fig. 18, will turn about the axis of the sleeve 181, Fig. 14, or as indicated in Fig. 18, about an axis passing through the adjusting screw 188 and the pin 240 of the releasing and closing lever will travel across the widened portion 239 of the gripper release actuator, but in operative relation thereto. During this movement, the retarding effect of the stock gripping pressure is relieved by the movable block 198 and the anti-friction ring 200, as hereinbefore described.

The time of gripper release by movement of the gripper releasing and closing lever 171 will depend upon the time in which the gripper release riser 237 meets the roll 236 on the gripper release actuator; consequently, the position of the frame 227 rotatively about the cam shaft 160 will determine the time of gripper release.

When the overdraw rod 203 is in its rearward position, the yoke 204 acting through the rod 220, Fig. 17, will turn the bell crank 218 and lift the measuring rod 222. As the overdraw movement takes place, the measuring rod 222, the lower end of which is resting upon the bell crank lever 218, will move downwardly as the bell crank is rotated, and will consequently turn the frame 227 about the axis of the cam shaft 160 an amount equal to the downward movement permitted to the measuring rod which, of course, is dependent upon the movement of the bell crank 218 which in turn is dependent upon the extent of the overdraw. Consequently, the gripper release riser 237 will operate the gripper release actuator sooner or later, dependent upon the position assumed by the frame 227 under the dictates of the measuring rod 222.

When the downward movement of the measuring rod 222 has been determined by the extent of the overdraw to thereby determine the time of gripper release, it is desirable to lock the frame 227 from further movement as the gripper release riser 237 meets the roll 236. To this end the invention provides a locking device which becomes effective at the end of the overdraw to lock the frame 227 in the position assumed by it in response to the length of the overdraw. When the gripper releases the upper, the overdraw spring, as hereinbefore described, moves the yoke 204 further inward and over the shoe bottom, and the parts assume the position indicated in Fig. 17, with the end of the bell crank lever 218 below and out of contact with the lower end of the measuring rod.

Figure 4:
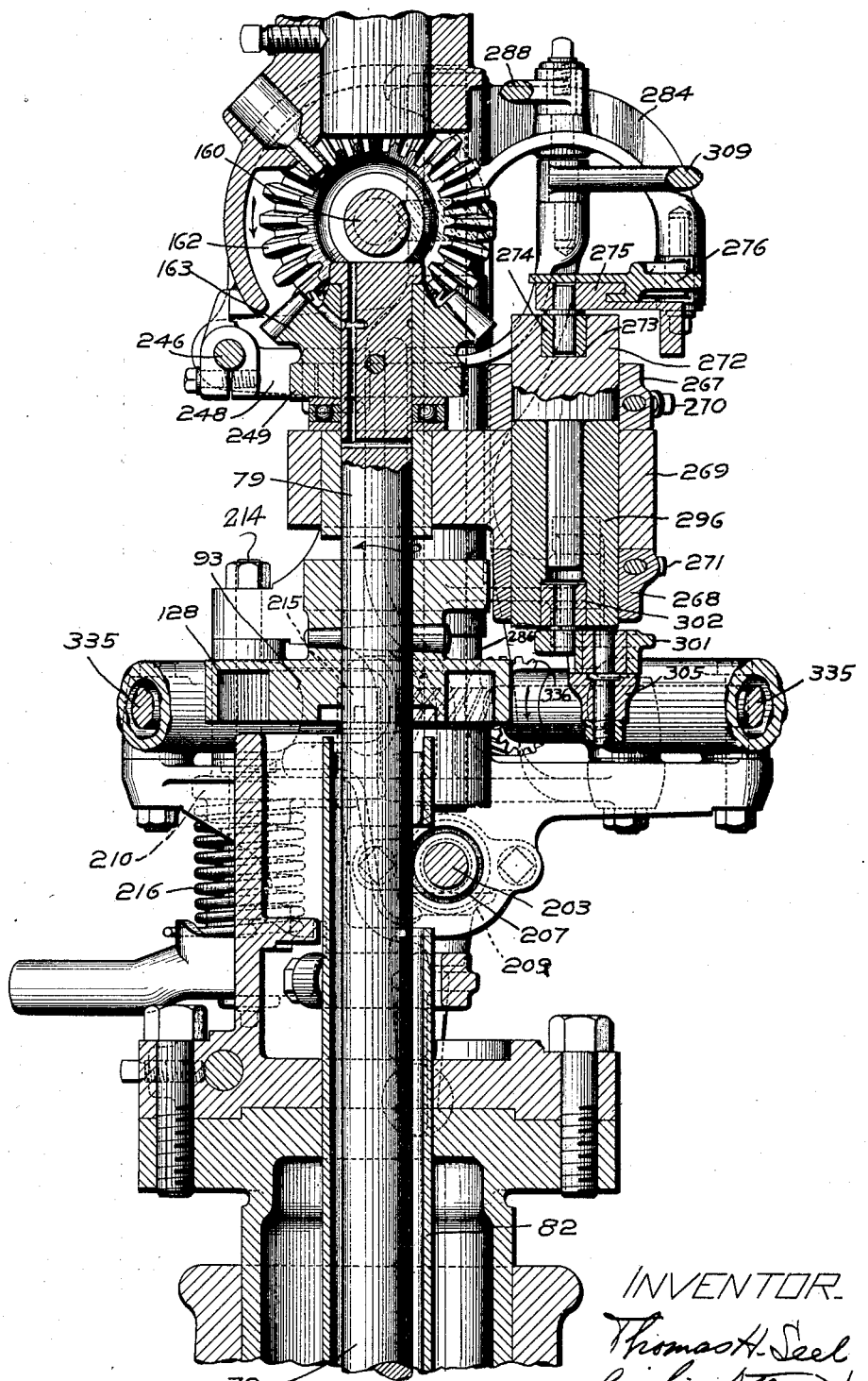
Fig. 4 is a section on the line 4—4 of Figs. 1 and 2.

A good form of lock for securing the measuring rod in position after it has measured the overdraw, consists of a series of slotted plates 242, Figs. 2 and 14, which are carried between the upper and lower bearings 243 and 244 in the measuring rod 222. Passing through the slots 245 of the locking plates is a locking bolt 246, Figs. 2 and 14, which is guided for longitudinal movements in appropriate bearings 247 formed in the head frame 40. The locking bolt 246 carries a shoe 248, Figs. 2 and 4, adapted to be engaged by a cam 249, Fig. 4, carried by the transmission shaft 79 and preferably formed as a hub portion of the bevel gear 163, as indicated in Fig. 4, the timing of parts being such that after the measuring rod 222 has measured the length of the overdraw, the cam 249 will operate the locking rod 246 to lock the measuring rod and hence, the frame 227 in the position determined by the length of the overdraw. When the riser 237 of the cam 235, Fig. 14, meets the roll 236, the gripper release actuator will be moved outwardly to thereby rock the gripper release and closing lever 171 and move the jaw carrying member 141 of the gripper upwardly, thereby fully releasing the upper; and when the riser 238 subsequently acts upon the roll 236, the gripper will be fully opened and positioned as indicated in Fig. 11, ready for taking another hold or grip of the upper.

In order that the locking rod 246 may effect a yielding lock, a spring 250, Fig. 2, is interposed between a washer 251 adjustably held upon the locking rod by suitable nuts 252, Fig. 2, and serves to yieldingly compress the plates 242 against one of the stationary bearings or lugs 247, Fig. 2.

When lasting a shoe by the hand method lasting machine, it is the custom to give the gripper an updraw and overdraw movement to lay the upper over the bottom of the last or innersole along certain portions of the shoe and to give them a turning or twisting movement either with or without a lateral or side reach movement while lasting other portions of the shoe. In lasting a McKay shoe, these later movements of the gripper are of special utility while lasting the toe and shank portions of the shoe. Ordinarily, with each lateral or side reach movement of the gripper, it has a turning movement in one direction and is incapable of being turned in the opposite direction with either one of the lateral or side reach movements. The direction in which the gripper is turned will of course determine the direction of the plait imparted to the upper to take up or absorb the fullness thereof. Some workmen prefer to plait the upper in one direction with each side reach or lateral movement, and others prefer to turn the gripper in the opposite or reverse direction with each side reach movement. It is impossible to accomplish these two turning movements of the gripper with each side reach movement in the prior construction of the hand method lasting machine, and consequently the range of the machine operation has been restricted. The present invention provides a novel mechanism under the control of the workman, for giving to the gripper with each side reach movement, a turning movement either to the right or to the left, as he may prefer, or as the condition of stock or style of shoe may dictate; and this selective movement of the gripper, in the present invention, is placed under the control of the workman by leg or knee-actuated means so that the workman may retain hold of the shoe with both hands while effecting either one of the characteristic movements described.

Mounted for rocking movement on the machine frame and rising into the head frame is a shaft 253 to which is connected at its lower portion a knee-operated lever 254, Figs. 25 and 26, the lever 254 being preferably splined to the shaft to effect rocking movement thereof when the lever 254 is moved laterally. The shaft 253 is surrounded by a sleeve 255, Fig. 26, from which extends an arm 256 having connected thereto at 257, Fig. 26, an operating lever 258 carrying at its end a knee or leg piece 259. The knee or leg piece 259 is preferably connected to the lever 258 adjustably by a set screw 260 in order to permit the leg or knee piece 259 to be raised or lowered in conformity with the requirements of the workman. The lever 258 has a slot 261, Fig. 26, through which projects a pin 262 rising from the lever 254. The pin may conveniently carry a roller to avoid undue friction. By movement of the knee or leg piece 259 to the right or left, Fig. 26, the lever 254 is correspondingly actuated and the connected shaft 253 is correspondingly rocked. The lever 258 which is connected to the sleeve 255, controls the tack feed and edge gage shifting mechanism, which will be later described.

Figure 5:
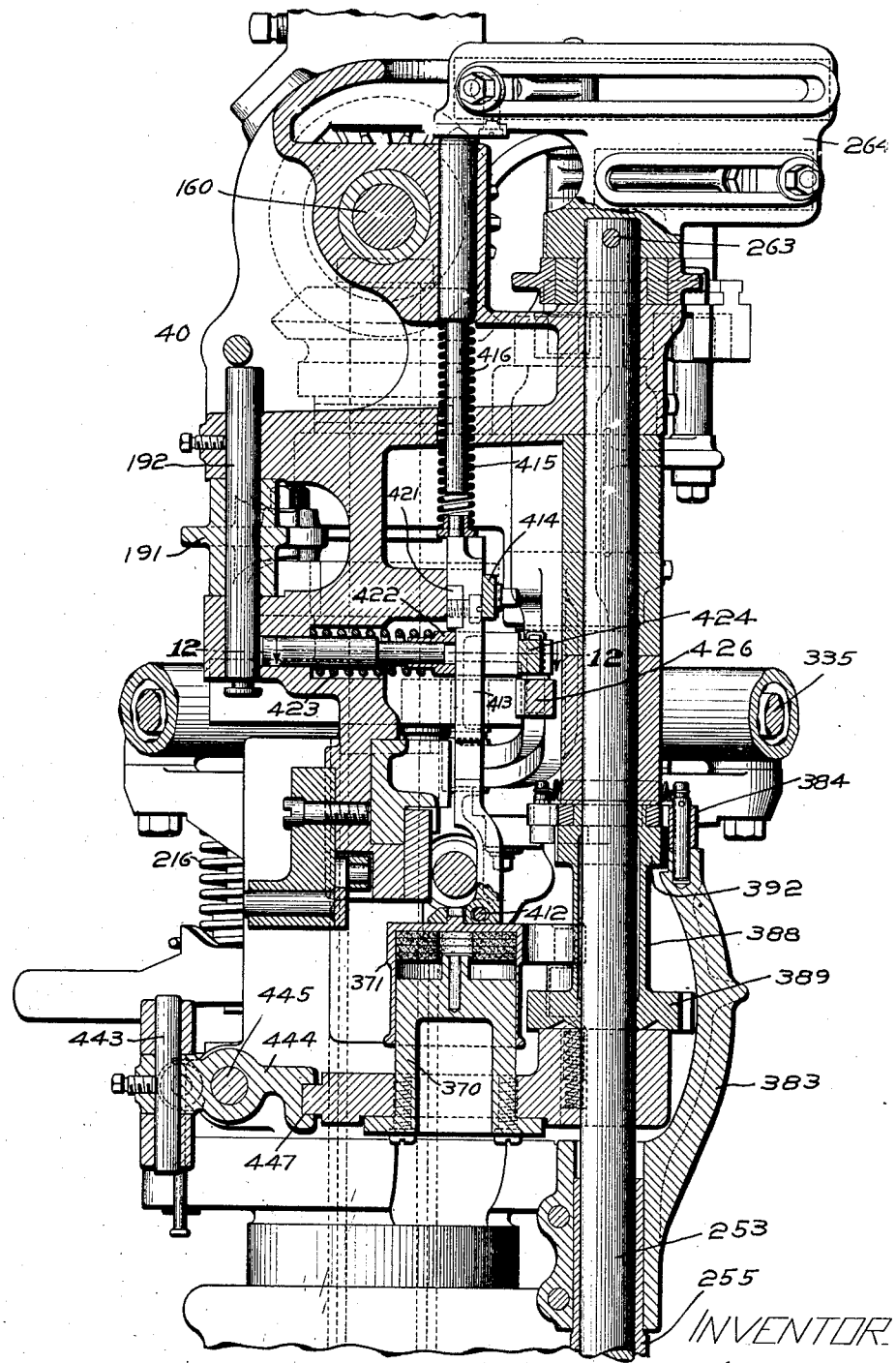
Fig. 5 is a sectional elevation on the line 5—5 of Figs. 1 and 2.

The shaft 253 has secured to its upper end by a pin 263, Fig. 5, a controller 264 which is best shown by Figs. 5, 10 and 16. The controller 264 is connected by trains of mechanism to a vibrator, presently to be described, and by rocking movement of the controller through the shaft 253, the trains of mechanism are caused to impart to the gripper the desired character of plaiting and side reach movements.

The vibrator consists of a frame 265, best shown in Fig. 16, which carries a roll 266 projecting upwardly therefrom and adapted to engage in the cam path 128 of the transmission cam 93, Fig. 11. The roll 266 of the vibrator, therefore, engages the same cam path of the transmission cam that actuates the tack carrier 127, as indicated by dotted lines in Fig. 10. The frame 265 of the vibrator, Fig. 4, has an upper clamping portion 267 and a lower clamping portion 268 disposed at opposite sides of a bearing 269 formed in the head frame of the machine. The clamping portions 267 and 268 of the vibrator are split and provided with clamping bolts 270 and 271. A block 272, preferably cylindrical in form, has a slot or groove 273 extending transversely thereof, Figs. 4 and 16, and the block 272 is adapted to be clamped to the upper portion 267 of the vibrator by the clamping bolt 270. The block 272 constitutes the turning means of the gripper; and before passing to a description of the portion of the vibrator for effecting the lateral or side reach movement of the gripper, it will conduce to clearness to follow through the train of mechanism for effecting the gripper turning movement.

Extending into the slot 273 of the vibrator block 272 is a roll 274 mounted on a pin extending downwardly from a block 275 mounted for transverse movement in an arm 276. The block 275 may be variously connected for transverse movement in the arm 276, but as illustrated it has an undercut flanged portion 277 which engages complemental grooves formed in the arm 276, the construction being such that the block 275 may be freely moved transversely of the arm 276.

Loosely mounted upon the upright shaft 253 is a sleeve 278, Fig. 16, from which extends an arm 279 carrying a roller 280 which may be conveniently mounted on a pin extending upwardly from the arm. The roller 280 engages a transversely-extending groove 281 formed in the block 275, the construction being such that should the block 275 be moved transversely of the arm 276, it will impart a rocking movement to the sleeve 278 which, as will presently appear, is connected to the gripper turning or twisting means by an arm 282, Fig. 16.

The arm 276 is pivotally connected at 283, Fig. 16, to an arm 284 extending from a sleeve 285 loosely mounted upon a shaft 286. The arm 284 has connected thereto at 287, a link 288, the outer end portion of which is adapted to be adjustably connected to the controller 264. The connection of the link 288 to the controller may be variously arranged, but in the present instance, the controller 264 is provided with a slot 289 which extends from one side of the axis of the shaft 253 to the other side thereof, as indicated in Figs. 5 and 16, and the link 288 carries a block 290 which is adapted to be shifted from one to another position in the slot 289 and to be secured in adjusted position by means of a bolt and nut 291. Movement of the controller 264, by movement of the knee lever as described, will impart more or less movement to the arm 284 depending on the position of the block 290 along the slot 289, and the direction of such movement will depend on whether the block 290 is located on one side or the other of the axis of the shaft 253. The movement of the arm 284 will move the arm 276 endwise to vary the position of the roll 274 along the slot 273 of the vibrator block 272 and thus control the extent and direction of the movement imparted to the block 275.

The arm 276 hereinbefore referred to, is provided with a bifurcated end portion 292 which embraces the shaft 253 and with respect to which it may be moved transversely. From the construction described it will be apparent that the block 275 will be moved relatively to the arm 276 in one direction or the other, according to the position of the roller 274 in the slot 273 of the vibrator. In other words, if the roller 274 is central of the slot 273 and the vibrator is actuated, there will be no movement of the block 275; but should the roller 274 be moved toward either end of the slot 273 in the vibrator block 272, movement will be imparted to the block 275 in one or the other direction, and such movement will be transmitted through the arm 279, sleeve 278 and arm 282 to cause the gripper to turn in one or the other direction. The position of the roller 274 in the slot of the vibrator block 272 is controlled by knee movement of the shaft 253 so that by movement of the leg or knee lever 254, hereinbefore described, to the right or left, the controller will be moved to position the roller 274 at one or the other side of the center of the vibrator block 272 and, upon vibrating movement being imparted to the vibrator, thereby cause turning movement of the gripper in one or the other direction.

The arm 282, Figs. 10 and 16, is connected at its forward end to the rack 144, hereinbefore described as being the means for turning the gripper. The connection between the arm 282 and the rack 144 is best indicated in Fig. 10. The arm 282 carries a pin 293 on which is swivelled a block 294 which engages an appropriate recess or slot 295 in the rack 144.

Clamped in the lower portion 268 of the vibrator is a lateral or side reach block 296, Fig. 4. This block preferably extends upwardly through the bearing 269 and in its lower face is provided with a transversely-extending slot or opening 297, best indicated by dotted lines in Fig. 16. Fulcrumed upon the shaft 286 is a sleeve 298 having an arm 299 extending therefrom and pivotally connected at 300 to a second arm 301, the front end portion of which carries a roller 302 which extends upwardly into the transversely-extending slot 297 in the lateral or side reach block 296. The arm 301 has a bifurcated end portion 303, Fig. 16, which embraces a pin-supported roller 304 extending from an arm 305 projecting from a sleeve 306 which is mounted for rocking movement on the shaft 253. The sleeve 306 has extending therefrom an arm 307 which is connected through a train of mechanism for giving the gripper the side reach or lateral movement. It will be obvious that the direction of the lateral or side reach movement imparted to the gripper will depend upon the position of the roller 302 in the transversely-extending slot of the block 297. The sleeve 298, which is described as loosely mounted for rocking movement upon the shaft 286, has an upwardly-extending portion 308, Fig. 16, to which is pivotally connected a link 309, the front end portion of the link being adapted for adjustable connection with the controller 264. The controller 264 has a second slot 310 into which extends an adjustable device connected to the link 309. Such device may be substantially the same as described for the connection between the link 288 and the controller, the construction being such that the link 309 may be adjusted in the slot 310 and secured in adjusted position.

Extending forwardly from the sleeve 306, the arm 307 is connected to a train of mechanism for imparting the lateral or side reach movement to the gripper; and inasmuch as the extent of such lateral or side reach movement may be limited by the upper material, a yielding connection is provided between the arm 307 and the train of mechanism for moving the gripper laterally.

Figure 13:
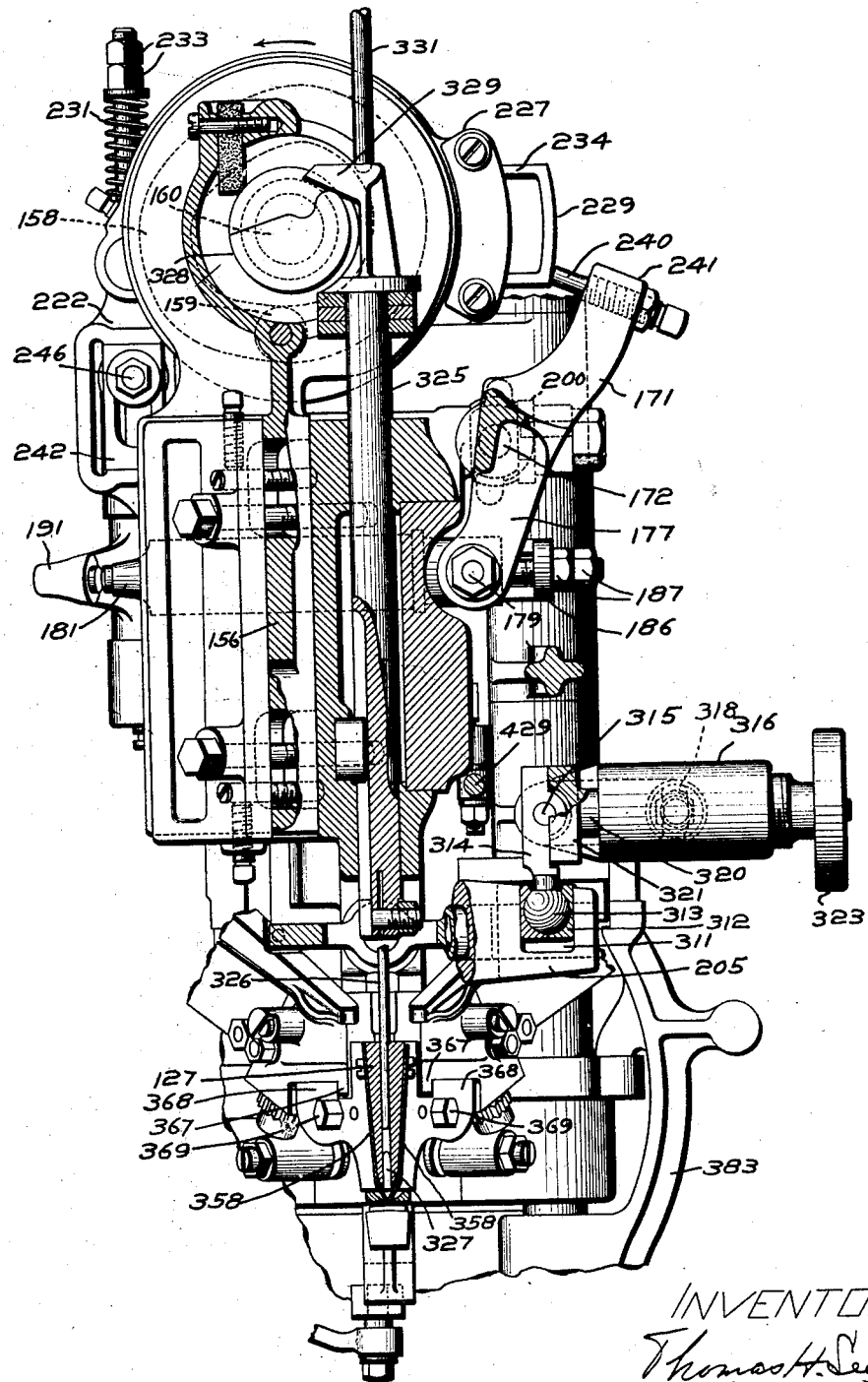
Fig. 13 is a section on the line 13—13 of Figs. 1, 2, 10 and 11.

The laterally-movable sleeve 205, hereinbefore described, and through the boss of which extends the gripper member 141, is provided with a slot 311 containing blocks 312 which embrace between them a ball 313, Figs. 13 and 17, from which rises an arm 314 carrying a pin 315. The arm 307 has adjustably connected to it a sleeve 316, the adjustable connection being afforded by a hollow threaded pin 317, Fig. 10, which passes through an elongated slot 318 formed in the arm 307 and is clamped in place by a suitable washer and nut 319.

The sleeve 316 carries a plunger 320, Fig. 13, having a head portion 321 which bears against the upstanding plate 314 under the impulse of a spring 322 within the sleeve 316. The tension of the spring may be adjusted by means of a hand-piece 323, Figs. 10 and 13. Should it be desired to change the initial position of the gripper or to centralize the gripper when in its normal open position and ready for grasping the upper, it is only necessary to release the washer and clamping bolt 319 and turn the sleeve 316 in a vertical direction, which, as will be apparent from Fig. 13, will cause movement of the slide 205 in one direction or the other to bring the gripper into the desired position. A spring plunger 324 (Fig. 10) engages longitudinal grooves in the inner end of the hand-piece 323 and serves yieldingly to hold the hand-piece in adjusted position and thus prevent accidental variation in the tension of the spring 322.

From the construction described, the gripper is given an increased range of gripper movements under manual control of the workman. By suitable adjustment of the links 288 and 309, relative to the controller, the amplitude of the gripper turning and lateral or side reach movements may be varied at will, or either the turning or side reach movements may be thrown out of action. By adjustment of the link 288 toward one or the other side of the central portion of the controller, the gripper turning movement may be made either toward the right or toward the left at either side of the shoe in any lateral or side reach movement of the gripper in one direction. These variations and diversity of range in the gripper movement are directly under the control of the workman who may adjust the gripper movements to suit his individual preference or the conditions prescribed by the style of shoe or the materials used.

The range and capacity of the illustrated machine are well indicated by the diagrammatic views in Figs. 32 and 33, wherein the shoe S is being lasted by the hand method about the toe. The upper materials a in Fig. 32, may be grasped by the gripper typified as at b, at the left side of the toe, and as the gripper is given its lateral or side reach movement to the right, it may be turned clockwise or in the direction of the arrow, Fig. 32, to plait or lay the upper to the left. On the opposite side of the toe, when the gripper is given its side reach movement to the left, it may be given a turning movement counterclockwise which will have the effect of again laying the plait to the left, similarly as it was laid at the opposite side of the toe. By manual adjustment of the gripper turning and laterally moving means of the present invention, the gripper, as indicated in Fig. 33, may be given a counterclockwise movement during its lateral or side reach movement to the right, Fig. 33, in order to lay the plait to the right; and when working on the opposite side of the toe and the gripper is given its lateral or side reach movement to the left, it may be turned clockwise to again lay the plait to the right. This diversity of laying the plait in the upper either to the right or left in any one lateral or side reach movement of the gripper, diversifies the application of the machine to meet the requirements of styles, materials, and workman preference, and such movements are placed under selective control of the workman himself.

When the direction of turning movement of the gripper is changed at the same side of the shoe to lay the plait in a direction reverse to that in which it had previously been laying it, it is necessary to adjust the gripper turning block 272 in order that the gripper may approach the work and grasp the upper in proper relation thereto. The adjustment of the block may be effected by manipulation of the clamping bolt 270. Similarly, if it be desired to change the adjustment of the gripper side reach block 296, the clamping bolt 271 may be manipulated to effect the change.

When lasting a shoe by the hand method machine, whether the shoe be a welt or McKay shoe, it is the practice to secure the upper in lasted position along certain portions of the shoe by one kind of tacks, and along another portion of the shoe by another kind of tacks, and a different gage is employed during the use of each kind of tack. To effect the shift from one kind of tack and gage to another kind of tack and gage, machines of this general type have been provided with manually controlled means usually requiring the workman to let go the work with one hand and make the shift. When changing the kind of tacks to be employed, if the proper kind of tack is not presented to the driving mechanism on the first operation thereof after a change in tacks, the workman is compelled to run the machine idle for at least one cycle to expel the improper kind of tack which is positioned for driving. It has been found that the use of compressed air enables the workman to present to the driving position a proper kind of tack on the first operation of that mechanism after a change of tacks.

Figure 9:
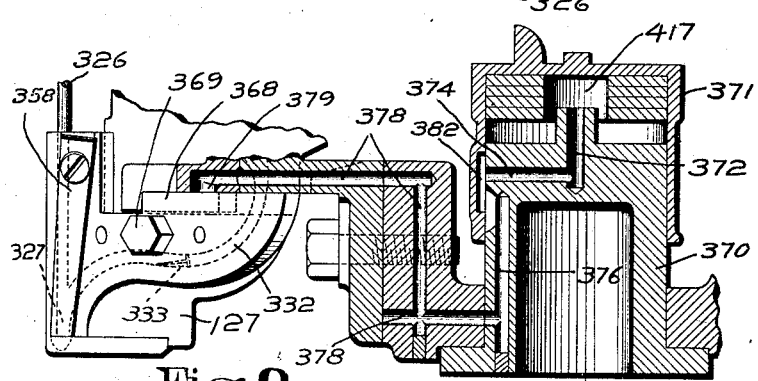
Fig. 9 is an enlarged section, substantially on the line 9—9 of Fig. 8.

The tack carrier 127 has mounted in the front end portion thereof a driver bar 325, Fig. 11, to the lower end of which is connected a driver 326, Figs. 9, 11 and 21. The driver 326 is adapted to be reciprocated in a driver passage 327 formed in the end portion of the tack carrier. The driver bar 325 is given its lifting movement by a cam 328, Fig. 13, mounted on the cam shaft 160 and engaged by an arm 329 extending from the head of the driver. When the cam 328 passes from under the arm 329, a spring-actuated arm 330, which may be of usual construction in this class of machines, imparts the downward or driving stroke to the driver bar through a link 331, Figs. 1 and 2.

Figure 8:
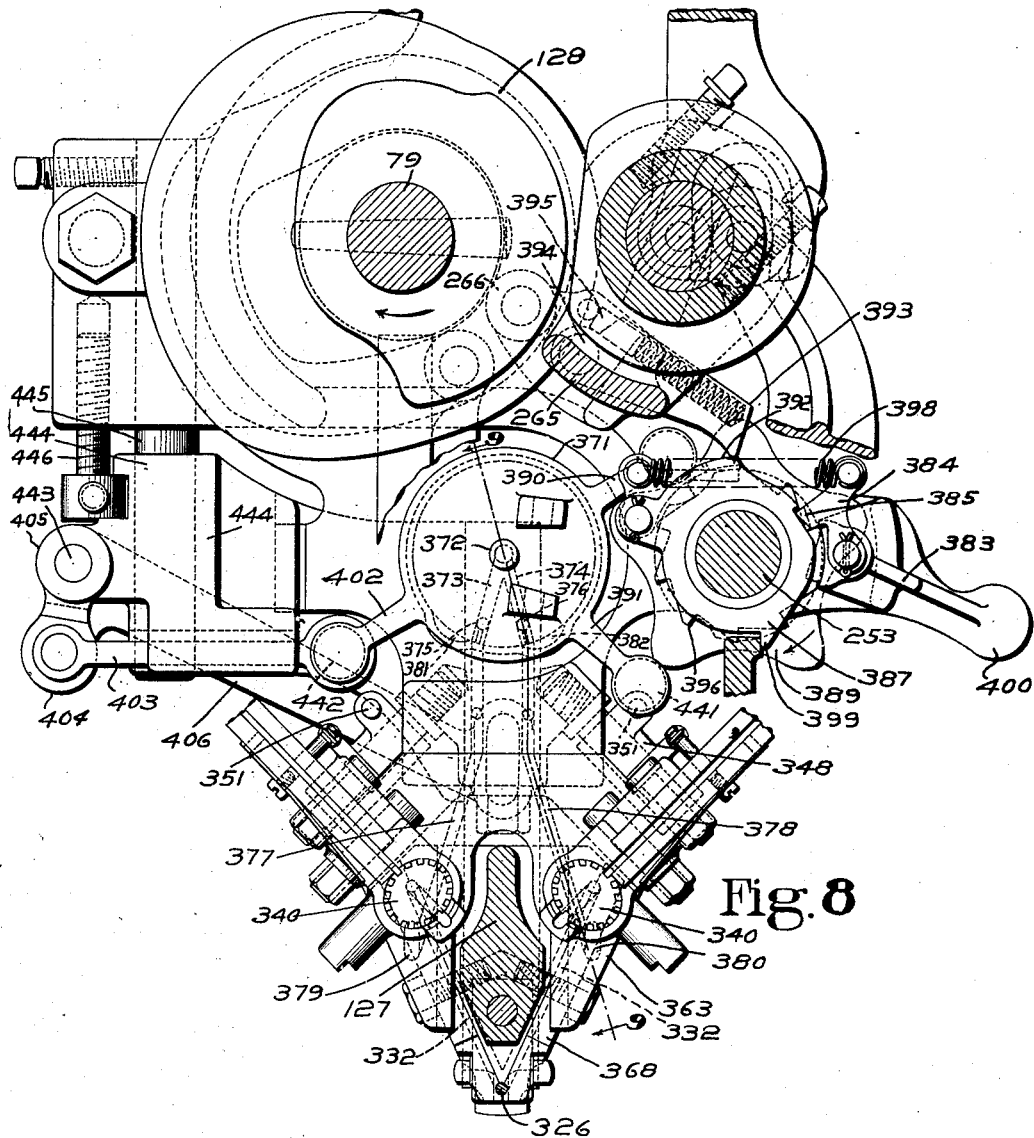
Fig. 8 is an enlarged horizontal section on the broken line 8—8 of Fig. 1.

Connecting with the driver passage 327 of the tack carrier are a plurality of conduits or passageways 332, Fig. 8, two of such conduits or passageways being indicated in the illustrated machine, although of course, it will be obvious that any desired number may be employed. Each of the conduits or passageways 332 is provided with a tack seat 333, Figs. 9 and 21, adapted to support a tack delivered to it from a tack-supplying mechanism.

The different kind of tacks, two in the present instance, are supplied from pots 334, one at each side of the machine. The tack-supplying pots may be of usual construction, and in the present instance of the invention they are shown as mounted on the machine frame and provided with rearwardly-extending shafts 335 which may be driven through a gearing connection 336, Figs. 4 and 10, from the upright shaft 286. Extending from each of the hoppers is a tack chute or raceway 337 to which tacks are delivered and by which they are directed toward the tack-separating position. The tack-supplying mechanism and the tack-separating mechanism are best indicated by Figs. 21 to 24, inclusive, and since both of the tack-supplying and tack-separating mechanisms are of substantially the same construction, a description of one will suffice for both.

The chute or raceway 337 may be of usual construction and provided with an overlying plate 338 which may be detachably secured in place by a spring-impelled catch 339, Fig. 21. At the lower end of the raceway is the separator which successively separates a single track from the end of the raceway and presents it for transfer to the tack carrier. The separator consists of a conical head portion 340, Figs. 21 and 22, having a series of tack carrying slots 341, each of which is adapted to be brought opposite the end of the raceway or chute successively as the separator is turned step-by-step. When one of the slots or openings 341 of the separator is in front of or in line with the column of tacks in the chute, the endmost tack will move into the opening and the head thereof will rest upon the top portion of the separator while the pointed end of the tack will enter the slot 341. The axis of the conical head portion 340 of the separator, as illustrated, is at right angles to the direction of extent of the raceway, and the angle which the slotted conical face of the separator makes with its axis is such that the tack receiving slots 341 are parallel to the stems of the tacks as they hang in the raceway with their heads shingled over each other, as clearly shown in Fig. 21. With this arrangement the lowermost tack in the raceway can enter one of the slots 341 by bodily gravitational movement without any change in the direction of its stem, which is nearly vertical; that is, the tack enters the slot at its natural hanging angle. The top face of the conical head is made slightly convex to afford a support for the head of the supported tack, which support is substantially parallel to the lower face of the tack head in the position of the tack when it enters the slot 341 and tends to cause the tack stem to swing toward the slot. To prevent overrunning of the separator 340 as it is turned, there is a friction plug 342, Fig. 22, normally pressed inwardly against the separator by a spring 343.

The conical head portion of the separator has projecting therefrom a downwardly-extending stem or shaft 344, Figs. 21 and 23, to the lower end of which is secured an actuating ratchet 345. Secured to a portion of the head frame 40 or a bracket secured thereto is a pin 346, Fig. 23, the outer end portion of which is formed with a seat for the reception of a spring 347. Mounted for turning movement on the exterior of the pin 346 is a sleeve 348 carrying a pawl 349 which is normally under the influence of a spring 350 tending to turn the pawl in a direction to actuate the ratchet 345 and perforce, move the separator in its operating step-by-step movement. The sleeve 348 has an abutment or projection 351, Fig. 23, which is adapted at times to be struck by a moving part to be hereinafter described, to impart to the sleeve 348 and the pawl 349 the backward stroke. Accurate alinement of the notches in the separator with the tack chute is important, and the sleeve 348 is provided with a stop screw 352 and a check nut 353 which limit the active stroke of the pawl 349 by limiting the inward sliding movement of the sleeve 348 on the pin 346 by engagement of the inner end of the adjusting screw 352 with the end portion 354 of the pin 346. When the sleeve 348 is turned backwardly or counterclockwise, viewing Fig. 21, the spring 347 moves the sleeve 348 outwardly until a pawl arm 355 engages the teeth of the ratchet 345 and acts as a stop. At this time the acting part of the pawl will be opposite the next tooth in the ratchet; and when the spring 350 is permitted to act, the pawl and sleeve 348 will be given movement in the active stroke or counterclockwise, viewing Fig. 21, to effect a step-by-step movement of the separator.

Opposite the line of tacks in the raceway, a separator casing 356, Fig. 22, is provided with a tack passage 357 into which a tack will be delivered on each step movement of the separator. When a separated tack, by reason of the rotation of the separator, reaches a point opposite to the raceway, it will be seen that, by reason of the conical form of the separator and the inclination of its axis, the tack is in a position sharply inclined to the vertical and, when no longer supported by the casing surrounding the separator, must fall off into the tack passage 357. This action of the tack is further facilitated by the convex top surface of the separator on which the tack head is resting at the time of its release, the part of said surface on which the head of the tack then rests being downwardly and outwardly directed at such an angle that the tack head must slide off into the tack passage. The timing of parts is such that when the tack carrier 127 moves backwardly, the conduits or passageways 332 in the tack block which communicate with the driver passage, will be brought into coincidence with the tack passage 357 in the tack separator casing and the tack will be permitted to fall by gravity into the position indicated by Figs. 9 and 21. The construction and timing of parts is such that when the tack carrier moves forwardly toward the shoe, each of the conduits or tack passages 332 in the tack carrier will contain a tack which will be supported in the conduit or passageway with its head facing rearwardly, as indicated in Figs. 9 and 21.

Adjacent to the driving passage in the tack carrier are secured tack holding springs 358, the lower ends of which springs, Figs. 9, 13 and 21, converge toward each other to insure that a tack which reaches the driving passage shall be held in position ready for the action of the driver.

When the tack separator is to be removed from the end of the tack raceway 337 for any reason, it is desirable that the line of tacks then in the raceway shall not run out of the raceway. To this end the raceway has secured to the side thereof near the lower portion, a spring 359 which acts upon the upper end of a stop 360, Fig. 24, pivotally mounted on the side of the raceway at 361 and having a finger or end portion 362 adapted to be projected across the path of the tacks when the stop 360 is permitted to respond to the action of the spring. To permit the separator to be removed, the casing thereof is provided with a cap-piece 363 which is held in position by a securing bolt 364, Figs. 2, 8 and 21. The cap-piece 363 has a lip portion 365, Fig. 24, which, when the cap is in position holding the separator in place, overlies the lower end portion 366 of the stop 360 and maintains the end 362 of the stop out of the path of the tacks in the chute. If, however, the cap-piece 363 is removed, the stop 360 is permitted to move into the path of the tacks and arrest them in response to the spring 359.

It is of importance that when the cap-piece 363 is removed from the separator, a series of tacks shall not pass downward into the ducts or passages in the nail block. The cap-piece 363 is provided with a forward extension 367, Fig. 21, which underlies a flange 368 formed as part of the tack carrier and containing one-half of the duct or passageway 332. The cap or flange-piece on the tack carrier is appropriately held in place to complete the passageway or duct 332 by means of a securing bolt 369, Figs. 9, 13 and 21. It will thus be seen, see Fig. 13, that the upwardly-extending flange on the cap or covering plate 368 overlies the flange 367 of the separator cap 363, the result being that before the separator cap can be removed, the cap carrying the flange 368 in which is formed one-half of the ducts or passageways 332 must be removed, so that any tacks falling from the separator when the cap 363 is removed, will not drop into or lodge in the ducts or tack passages of the tack carrier.

The novel subject matter embodied in the tack handling mechanism above described is not claimed herein since it is claimed in my copending divisional application Serial No. 417,475, filed December 30, 1929.

In accordance with the present invention, the tacks which are supported on the tack carrier as the latter moves toward the shoe, are to be selectively moved into tack-driving position by air pressure. The sudden impulse of the air pressure exerted upon a tack in the tack passage of the tack carrier serves to impulsively and effectively transfer the tack from its seat or support on the carrier to driving position and enables the workman to effect delivery of a desired kind of tack to the first operation of the tack-driving mechanism after a change in the kind of tacks that are to be driven.

Mounted on the head frame 40 (Fig. 5) is a compressed air-supplying means which, in the present instance of the invention, consists of an air compressor or pump, but which, of course, may be otherwise arranged. The air compressor or pump in the present instance, consists of an inner fixed member 370 which may be termed for identification, "the fixed piston". Mounted exteriorly of the fixed piston for reciprocating and rotative rocking movement is a cylinder 371. The piston 370 has a central air passage 372 and radially-extending air passages 373 and 374 and longitudinally-extending air passages 375 and 376, the latter two passages of which are in communication with air ducts or passages 377 and 378, Figs. 8 and 9. The air passages 377 and 378, one each side of the tack carrier, extend forwardly and terminate in delivery ports 379 and 380 which are adapted to be placed in communication with the two ducts or passages 332 in the tack carrier as the latter approaches its front or tack-driving position.

The cylinder 371 has ports 381 and 382, which may establish communication with the air passages 379 or 378, in accordance with the rotated position of the cylinder 371, see Fig. 8.

When the tack carrier 127 is moved backwardly during the operation of the machine, as indicated in Fig. 21, the ducts or passages 332 are alined with the tack delivery passages 357 and a tack is delivered to the vacant duct or passage 332. When the tack carrier is moved forwardly or toward the shoe, and is approaching tack-driving position, the ducts or passages 332 are brought into register with the ports 379 and 380 leading to the air compressor, and, as will hereinafter more fully appear, a blast of air is caused to impulsively move one of the tacks into the driving passage, provided the air compressor has been actuated to furnish compressed air.

To enable the workman to determine at will which tack shall be delivered to the driving passage, mechanism is provided under his control to effect the desired purpose, and such mechanism will now be described. The sleeve 255, hereinbefore referred to, which surrounds the controller-actuating shaft 253, Figs. 5 and 26, is capable of rocking movement under knee actuation of the knee-controlled arm 258, Figs. 25 and 26. At its upper end the sleeve 255 carries an arm 383, Figs. 5, 8, 13 and 19, on the upper end portion of which is pivotally mounted a pawl 384, the leading end 385 of which is normally engaged with a tooth 386 on a shield 387 which is loosely supported on the upper end of a sleeve 388, Figs. 5 and 19, which carries at its lower end a cam 389. This cam is formed with five alternately-arranged projections and depressions. The cylinder 371 has two projecting arms 390 and 391, Fig. 8, constructed and arranged so that when the roller on the end of one of these arms is in engagement with a projecting portion of the cam 389, the roller on the other arm is in a depressed portion of the cam, substantially as indicated in Fig. 8, the construction being such that should the sleeve 388 and the cam 389 be given a rocking movement through a suitable arc, the rollers on the arms 390 and 391 will change positions, that is, the roller which was before on a high part of the cam will be moved into a low part of the cam, and the roller which was previously on a low part of the cam will be moved to a high part of the cam, thus causing the cylinder 371 to be rocked on the fixed piston 370 and change the air connections between the air passages in the fixed piston and the air passages 377 and 378.

The shield 387 has depending therefrom a pawl protector or lug 392, Figs. 8 and 19, which normally underlies the end of an actuating pawl 393, Figs. 8 and 19, which is itself pivotally mounted at 394 on the vibrator 265, hereinbefore described, whereby operating movement is imparted to the pawl. The pawl 393 is under the impulse of a spring-actuated plunger 395, Figs. 8 and 19, which serves to impel the acting end of the pawl into its operative position. Secured to the sleeve 388 is a ratchet-wheel 396, the construction being such that normally the acting end of the operating pawl 393 will be held out of engagement with the teeth of the ratchet-wheel by the pawl protector 392 carried by the shield, and the cylinder 371 of the air compressor will therefore remain in the established position. The shield 387 carries a pawl 397, for a purpose to be described, and a spring 398 connects the pawls 384 and 397. A stop finger 399 on the shield 387, Figs. 8 and 19, normally rests against a fixed part of the frame, as best indicated in Fig. 8.

When the sleeve 255 is rocked by the knee-control or by a hand-piece 400, the pawl 384 will be moved to turn the shield 387 and carry the pawl protector 392 out of its obstructing position with reference to the end of the actuating pawl 393 which will, when actuated by the vibrator, move inwardly to engage the ratchet and give it a step movement. The pawl 397 will, at this time, drop into engagement with one of the teeth of the ratchet 396 and act as a temporary lock for the shield to insure actuation of the ratchet by the pawl 393 and prevent an immediate second operation of the shield by the workman. Turning of the sleeve 388 by the actuating pawl 393 causes the cam 389 to impart a rocking movement to the cylinder 371 to change the connection between the air passages from the one previously in use to the one previously idle. Rotation of the ratchet wheel 396 by the pawl 393, as just described, will also cause a tooth of the ratchet wheel to engage the surface 401 of the pawl 384 and disengage the tooth 385 from the tooth 386 of the shield, thus permitting the spring 398 to return the shield to its normal position, as indicated in Fig. 8, and the parts will continue to operate with the proper communication established in the air passages, as determined by the knee-control of the workman.

When the tacks are changed, it is desired to change the gages in order to position the shoe properly for the kind of tack to be driven. To this end the cylinder 371 has a third arm 402, Fig. 8, which is connected by a link 403 to an arm 404 projecting from a hub portion 405 of a thick gage operating arm 406. The thick gage 407, Figs. 7 and 11, is mounted for sliding movement in a guideway 408 on the under side of a thin gage 409, best indicated in Fig. 11, and is provided with a groove 410 which is engaged by a block or pin 411 rising from the end of the thick gage operating arm 406. The construction is such that when the cylinder is moved under knee control of the workman, as hereinbefore explained, the thick gage 407 will be projected or retracted to present the proper gage to be used in connection with the kind of tacks to be driven. Thus the workman, under knee control, may determine at will which kind of tack shall be used, and coincidently therewith change the gages in conformity with the change of tacks, without releasing his hold of the shoe by either hand.

When the workman has finished lasting one shoe and reaches for another, he customarily maintains his foot upon the treadle and the machine continues in operation. Under these conditions, it is desirable to prevent unnecessary loss and waste of tacks; therefore, the present invention provides means for suspending the supply of compresed air to either of the air pasages when a shoe is not presented to the machine for treatment.

The air compressor cylinder 371 is connected at 412 to a lifting bar 413, Figs. 5 and 11, which is guided for vertical movement in a bearing or guide 414 formed on the machine head. A spring 415 bears upon the upper end of the bar 413 and is guided or supported by a rod 416 secured in the machine head, the construction being such that when the lifter bar 413 is free to be moved downwardly, the spring 415 will effect such movement and cause the compression of air in an air compresion chamber 417, Fig. 9. The lifter bar 413 is provided with a shoulder 418, Fig. 11, which is adapted to be engaged by a lifting pawl 419, Fig. 11, pivotally mounted on the tack carrier slide 127 at 420, the construction being such that when the tack carrier slide moves inwardly it will lift the lifter bar 413; and when the tack carrier slide moves outwardly toward tack-driving position, the lifter bar will be freed to the action of its operating spring 415.

Figure 12:
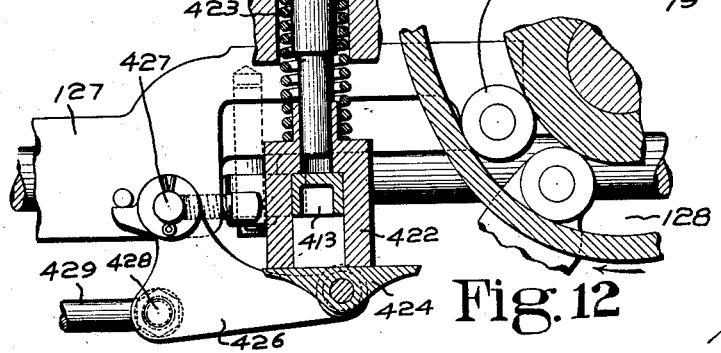
Fig. 12 is a detached detail horizontal sectional view on the line 12—12 of Fig. 11.

When no shoe is presented for treatment, however, it is desirable that the lifter bar 413 shall not respond to the impulse of its actuating spring; and to this end the lifter bar is provided with a block 421, Fig. 5, the lower edge of which presents a shoulder which is carried upwardly beyond the end of a locking slide 422 when the lifter bar is raised by the retreating movement of the tack carrier slide 127. A spring 423, Figs. 5 and 12, normally impels the locking slide 422 into position below the block 421 on the lifter bar and consequently locks it in its raised position. The locking slide 422 is bifurcated as indicated in Fig. 12, and its ends bear upon a face of a rocker 424 pivotally supported on a lever 426 which is itself pivoted at 427 on the tack carrier slide 127. The length of the face on the rocker 424 is sufficiently extensive to permit it to bear upon the ends of the bifurcated slide 422 as the tack carrier slide moves throughout its stroke.

Figure 15:
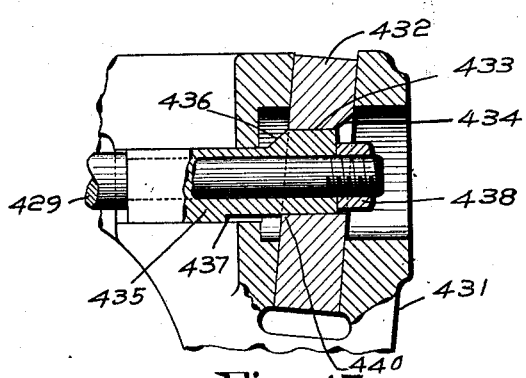
Fig. 15 is a detail section of portions of the shoe rest controlling means taken on the line 15—15 of Fig. 3.

Pivotally connected at 428 to the lever 426 is a connecting rod 429, Fig. 12, which extends toward the front of the machine and is there connected to a shoe rest slide 430, Figs. 1, 2 and 15. The shoe rest slide 430 is mounted for up or down sliding movement in a guiding support 431, Figs. 1, 2, 3 and 15, and has a side projecting head 432, Figs. 3 and 15, which is provided with an opening 433 having a beveled or inclined portion 434, Fig. 15. The rod 429 carries a head 435, Fig. 15, having an inclined portion 436 and an under shouldered abutment 437. The head 435 is conveniently held to the rod 429 by a nut 438, Fig. 15. The lower end of the shoe rest slide is provided with a shoe rest 439 which is normaly held in its raised or upper position properly to present a shoe to the lasting means, and is adapted to move from said upper or normal position just prior to the driving of a tack, provided no shoe is presented to the machine.

Having reference particularly to Figs. 12 and 15, when the tack slide 127 moves forwardly, the lever or swinging arm 426, Fig. 12 moves with it and the headed end 435 of the rod 429 moves forwardly through the opening in the portion 432 of the shoe rest slide. If a shoe is presented for treatment as the slide 127 and the rod 429 move forwardly, the shoe rest slide 430 and its connected lateral extension 432 will remain in their upper or normal shoe positioning relation with the lasting means, and the shouldered portion 437 of the head 435 will meet the edge of the opening through the lateral extension 432 at 440, thereby stopping forward movement of the rod 429 and causing the lever 426 to swing about its fulcrum 427 on the tack carrying slide. Under these conditions the rocker 424 will push back the locking slide 422 and free the lifter bar 413 to the action of its spring 415. If, however, no shoe is presented for treatment when the tack carrier slide moves forwardly, the side extension 432 of the slide 430 will drop downwardly as the incline 436 comes opposite the incline 434, Fig. 15, and the rod 429 will continue its forward movement without being stopped. Under these conditions, the lever 426 will not be turned upon the pivotal support 427, Fig. 12, and the lifter bar 413 will remain locked. Since the lifter bar when in locked position, suspends the supply of compressed air, it follows that no tack will be delivered to the driving passage of the tack carrier.

By normally maintaining the shoe rest and its slide in position, as hereinbefore described, the workman is not called upon to move the shoe rest when he places a shoe in the machine for treatment; but on the contrary, the shoe rest serves as a further guide for properly positioning the shoe. This construction also gives the workman an increased amount of time to get his shoe into lasting position before the critical moment arrives when a tack is to be delivered to the driver.

When no tack is moved from its position of rest to the driving passage on the tack carrier, under the conditions above described, it is desirable that no tack shall be delivered to the tack carrier from the tack selecting mechanism as the tack carrier retreats, because the tack carrier then contains two tacks, one in each duct or passage. To effect this object of the invention, the cylinder 371 of the air compressor carries two downwardly-extending pins, one of which will be positioned to actuate the pawl 349, Fig. 23, of one of the tack separators, according to which kind of tack is to be delivered to the tack carrier. In the illustrated machine, as shown by Figs. 8 and 21, the arm 391 has a downwardly-extending pin 441 which, when one kind of tack is to be delivered to the tack carrier, is in position to engage the abutment 351 of the pawl carrying the sleeve which actuates the tack separator. Another downwardly-extending pin 442, Fig. 8, is carried by the arm 402 extending from the cylinder 371, and when the pin 441 is positioned to actuate the separator to deliver one kind of tack, the pin 442 is swung out of operative relation to the abutment 351 of the other tack-separating mechanism. If, however, the air compression cylinder 371 is locked in its raised position, as hereinbefore described, neither one of the pins 441 nor 442 will move downwardly, and consequently neither of them will be effective in delivering a tack from either tack separator to the tack carrier.

It may be desirable at times to adjust the relation of the thick and thin edge gage so that when the thick edge gage moves to and from operative position, its proper location may be obtained. The hub 405 of the arm 406, Fig. 6, through which movement of the thick edge gage is effected, is mounted to rock upon a pin 443 carried by a block 444 which is adjustable, Figs. 5 and 6, upon a rod 445 secured in the machine frame and movable thereon under manipulation of an adjusting screw 446. The adjustable block 444 has its end 447 bifurcated to engage a portion of the frame to prevent rocking movement of the block on the rod 445, Fig. 5.

What is claimed is:—

1. In a machine of the class described, the combination of a gripper constructed and arranged to lay the upper of a shoe over the bottom of a last, a cooperating wiper, and means for varying the time of gripper release in accordance with the length of stock overdrawn by the gripper.

2. In a machine of the class described, the combination of a gripper constructed and arranged to lay the upper of a shoe over the bottom of a last by successive movements of similar kind, and means for effecting release of the upper by the gripper in accordance with the length of stock overdrawn by the gripper.

3. In a machine of the class described, the combination of a gripper constructed and arranged to lay the upper of a shoe over the bottom of a last, a cooperating wiper, and automatic means independent of the wiper for causing the gripper to release short stock sooner than long stock.

4. In a machine of the class described, the combination of a gripper having an overdraw movement, a cooperating wiper, and gripper releasing means the time of operation of which is dependent upon the length of stock overdrawn by the gripper.

5. A machine of the class described, having, in combination, a gripper constructed and arranged to overdraw an upper varying amounts in accordance with the length of stock, a wiper having successive wiping movements of similar kind, and a gripper release which releases the upper when the wiper reaches a predetermined position relative to the gripper regardless of the length of the overdrawn stock.

6. In a machine of the character described, the combination of a gripper, means for causing the gripper to overdraw an upper varying amounts, a wiper, and means governed by the overdraw movement of the gripper for varying the length of time that the gripper holds the upper.

7. In a machine of the class described, the combination of a gripper constructed to grip, overdraw, and release the upper, a wiper cooperating with the gripper, and means dependent upon the extent of the overdraw movement of the gripper for varying the time of gripper release.

8. In a machine of the class described, the combination of a gripper constructed and arranged to overdraw an upper, a wiper having reciprocating movements of similar kinds toward and from the gripper, and means for causing the gripper to release the upper earlier relative to the wiping movement of the wiper when the overdraw of the gripper is small than when the overdraw of the gripper is larger.

9. In a machine of the class described, the combination of a gripper constructed and arranged to overdraw an upper, a cooperating wiper movable toward the gripper, and means for automatically varying the time of gripper release in accordance with the overdraw movement of the gripper.

10. In a machine of the class described, the combination of a gripper constructed and arranged to overdraw an upper, a cooperating wiper, means for determining the time of gripper release in accordance with the length of stock overdrawn by the gripper, and a lock to prevent disturbance of the time of gripper release when it has been determined by the length of stock.

11. In a machine of the class described, the combination of a gripper constructed and arranged to overdraw an upper, means for closing and opening the gripper to grasp and release the upper, and means for varying the time of operation of the gripper opening means in accordance with the extent of overdraw.

12. In a machine of the class described, the combination of a gripper constructed and arranged to overdraw an upper, means for closing and opening the gripper to grasp and release the upper, and means for advancing or retarding the time of operation of the gripper opening means dependent upon the length of overdraw movement.

13. In a machine of the class described, the combination of a gripper constructed and arranged to overdraw an upper, means for closing and opening the gripper to grasp and release the upper, means for varying the time of operation of the gripper opening means in accordance with the extent of overdraw, and locking means for locking the varying means when the time of release has been established.

14. In a machine of the class described, the combination of a gripper for treating a shoe by successive operations on different portions thereof, means for opening the gripper, a tack slide movable toward the gripper to place a tack in driving position, and means for varying the time of operation of the gripper opening means on successive operations of the gripper.

15. In a machine of the class described, the combination of a gripper for overdrawing a shoe upper by successive operations along different portions of the upper, a tack slide for presenting a tack to secure the upper in overdrawn position, gripper releasing means, and means for varying the time of operation of the gripper releasing means in accordance with the extent of the overdraw.

16. In a machine of the class described, the combination of a gripper for overdrawing a shoe upper by successive operations along different portions of the upper, a tack slide for presenting a tack to secure the upper in overdrawn position, gripper releasing means, means for varying the time of operation of the gripper releasing means in accordance with the extent of the overdraw, and means for locking the varying means after the time of operation of the releasing means has been established.

17. A machine of the character described, having, in combination, a gripper constructed and arranged to overdraw a shoe upper, a tack slide cooperating with the gripper, cam controlled means for opening the gripper to release the upper, and means for varying the time of operation of the cam means in accordance with the extent of the overdraw.

18. In a machine of the class described, the combination of a gripper, means for causing the gripper to grasp and release the upper of a shoe, overdraw means for causing the gripper to lay the upper over the bottom of the last, and means operatively related to the overdraw means for effecting release of the upper in accordance with the extent of the overdraw.

19. In a machine of the class described, the combination of a gripper, means for causing the gripper to grasp and release the shoe upper, overdraw means for causing the gripper to draw the edge of the upper over the bottom of the last an amount dependent upon the condition of the upper, and means between the overdraw means and gripper release for effecting release of the upper in accordance with the extent of overdraw permitted by the condition of the upper.

20. In a machine of the class described, the combination of a gripper, means for causing the gripper to grasp and release the shoe upper, overdraw means for causing the gripper to draw the edge of the upper over the bottom of the last an amount dependent upon the condition of the upper, a tack slide for presenting a tack to be driven into the overdrawn upper, and means between the overdraw means and gripper release for effecting release of the upper in accordance with the extent of overdraw permitted by the condition of the upper.

21. A machine of the class described, having, in combination, a gripper constructed and arranged to overdraw the upper varying amounts under different conditions of work, a cooperating tack slide, means for repeatedly moving the tack slide in predetermined similar paths between fixed limits, and means for releasing the upper from the gripper earlier or later in the movement of the tack slide in accordance with the extent of the overdraw.

22. In a machine for laying the edge of an upper over the bottom of a last, the combination of a gripper for acting upon the upper by successive operations of the gripper, means for causing the gripper to grip and overdraw the upper, a gripper release cam for causing the gripper to release the overdrawn upper, and means controlled by the extent of overdraw for modifying the action of the gripper release cam.

23. In a machine for laying the edge of an upper over the bottom of a last, the combination of a gripper for acting upon the upper by successive operations of the gripper, means for causing the gripper to grip and overdraw the upper, a gripper release cam, an arm actuated by the cam for causing the gripper to release the overdrawn upper, and means controlled by the extent of overdraw for modifying the action of the gripper release cam.

24. In a lasting machine, the combination of a gripper for overdrawing a shoe upper by repeated operations of the gripper, a tack slide having a movement toward the overdrawn upper, and a gripper release comprising a cam, an arm actuated by the cam to release the hold of the gripper on the upper, and means for advancing or retarding the action of the arm by the cam in accordance with the extent of overdraw.

25. In a machine of the class described, the combination of a gripper constructed and arranged to overdraw the upper of a shoe, means for causing the gripper to release the upper in accordance with the extent of overdraw, and a lock for preventing a change in the relation of parts when the limit of the overdraw has been reached by the gripper.

26. In a machine of the class described, the combination of lasting means including a gripper for laying the upper of a shoe over the bottom of a last, and means for causing the gripper to release the upper in accordance with the overdraw movement of the gripper, and then to open the gripper for again gripping the upper.

27. In a machine of the class described, the combination of lasting means including a gripper for laying the upper of a shoe over the bottom of a last, a gripper release actuator, means for moving the actuator to effect gripper release, and means for varying the time of operation of said moving means in accordance with the length of the overdraw.

28. In a machine of the class described, the combination of lasting means including a gripper constructed and arranged to lay the upper of a shoe over the bottom of a last, a gripper releasing lever, means for actuating the lever to effect release of the upper by the gripper, and means for varying the time of operation of said means in accordance with the length of overdraw.

29. In a machine of the class described, the combination of lasting means including a gripper constructed and arranged to lay the upper of a shoe over the bottom of a last, a gripper releasing lever, means for actuating the lever to effect release of the upper by the gripper, means for varying the time of operation of said means in accordance with the length of overdraw, and a lock for preventing further movement of the varying means after the extent of the overdraw has been measured by the gripper.

30. In a machine of the class described, the combination of lasting means including a gripper constructed and arranged to lay the upper of a shoe over the bottom of a last, a gripper release comprising a lever, an actuator for moving the lever, a cam for moving the actuator, and a support carrying the actuator and movable to vary the relation of the cam and actuator in accordance with the movement of the gripper determined by the length of overdraw.

31. In a machine of the class described, the combination of lasting means including a gripper constructed and arranged to lay the upper of a shoe over the bottom of a last, a gripper release comprising a lever, an actuator for moving the lever, a cam for moving the actuator, a support carrying the actuator and movable to vary the relation of the cam and actuator in accordance with the movement of the gripper determined by the length of overdraw, and a lock for locking the support at the completion of the overdraw movement of the gripper.

32. In a machine of the class described, the combination of a gripper constructed and arranged to lay the upper of a shoe over the bottom of a last, a gripper release which is made effective to release the hold of the gripper at varying times in the gripper movement dependent upon the length of the overdraw, means for measuring the length of the overdraw, means positioned by the extent of the overdraw, and a lock for the positioned means.

33. In a machine of the class described, the combination of a gripper constructed and arranged to lay the upper of a shoe over the bottom of a last, a shaft carrying a gripper releasing cam, a slide adapted to be moved by the cam to release the hold of the gripper, a support carrying the slide, and connections between the support and the gripper overdraw for changing the relative positions of the cam and slide in accordance with the length of the upper overdrawn.

34. In a machine of the class described, the combination of a gripper constructed and arranged to treat different portions of a shoe by successive operations, mechanism for imparting either of two kinds of movements to the gripper, one a turning and the other a lateral movement, means for selectively determining at will which kind of movement shall be imparted by said mechanism, and means controlled by the leg of the workman for rendering the mechanism operative to effect the selected gripper movement while both hands of the workman retain control of the work.

35. In a machine of the class described, the combination of a gripper constructed and arranged to treat different portions of a shoe by successive operations, mechanism for turning the gripper and for moving the gripper laterally, means for causing said mechanism to move the gripper laterally in one direction and selectively to turn it in either direction, and means controlled by the leg or body of the workman for rendering the mechanism operative to effect the selected gripper movement while both hands of the workman retain control of the work.

36. In a machine of the class described, the combination of a gripper constructed and arranged to treat different portions of a shoe by successive operations, means for imparting turning and lateral movements to the gripper, means for independently varying the amplitudes of the turning and lateral movements which may be imparted to the gripper, and means controlled by the leg or body of the workman for causing said mechanism to impart turning and lateral movements of the selected amplitudes while both hands of the workman hold the shoe.

37. In a machine of the class described, the combination of a gripper constructed and arranged to lay the upper of a shoe over the bottom of the last, separate trains of mechanisms for imparting turning and lateral movements to the gripper, means for independently changing the amplitude of either the turning or lateral movements while the other remains constant, and means controlled by the leg or body of the workman for causing said mechanisms to impart the turning and lateral movements while holding the shoe with both hands.

38. In a machine of the class described, the combination of a gripper, a train of mechanism for imparting lateral movement to the gripper, a train of mechanism for imparting a turning movement to the gripper, means for rendering either of said trains of mechanism ineffectual, and means common to both trains of mechanism actuated by the leg of the workman for causing the operation or non-operation of that train of mechanism that remains effectual.

39. In a machine of the class described, the combination of a gripper, a train of mechanism for imparting lateral movement to the gripper, a train of mechanism for imparting a turning movement to the gripper either to the right or to the left, means for rendering either of said trains of mechanism ineffectual, and means common to both trains of mechanism actuated by the leg of the workman for causing the operation or non-operation of that train of mechanism that remains effectual.

40. In a machine of the class described, the combination of a gripper constructed and arranged for laying the upper of a shoe over the bottom of a last by repeated operations of the gripper on different portions of the work, trains of mechanism for imparting turning and lateral movements to the gripper, unitary means operable by the leg of the workman for rendering said trains of mechanism operative or inoperative, and means for rendering either of said trains of mechanism non-responsive to the unitary means at the will of the workman.

41. In a machine of the class described, the combination of a gripper mounted for turning and lateral movements, and means for turning the gripper in either direction while it is moved laterally in one direction.

42. In a machine of the class described, the combination of a gripper constructed and arranged to lay the upper of a shoe over the bottom of a last by repeated operations, and means for moving the gripper laterally and for turning it either to the right or left as it is moved laterally.

43. In a machine of the class described, the combination of a gripper, means for moving the gripper laterally in reverse directions in treating opposite side portions of a shoe, and means for turning the gripper in either direction as it is moved laterally in the same direction.

44. In a machine of the class described, the combination of a gripper, means for moving it laterally to the right while treating a portion of a shoe at one side of the median line and to the left while treating a portion of the shoe at the other side of the median line, and means for selectively turning the gripper in either direction as it is moved to the right or left.

45. In a machine of the class described, the combination of a gripper, and means for moving the gripper laterally and turning it to plait the work to the right or to the left relative to the same lateral movement.

46. In a machine of the class described, the combination of a gripper mounted for turning and lateral movements, means for turning the gripper in either direction while it is moved laterally in one direction, and means for varying the amplitude of the gripper movements.

47. In a machine of the class described, the combination of lasting means including a wiper and a gripper, means for moving the wiper over the shoe bottom, and means for moving the gripper laterally and for turning either to the right or left as it is moved laterally in the same direction.

48. In a machine of the class described, the combination of a gripper constructed and arranged to lay the upper of a shoe over the bottom of a last by repeated operations, a wiper which is moved repeatedly over the last bottom, and means for moving the gripper laterally as it progressively acts upon the upper along one portion of the shoe and for selectively turning it in either direction to plait the upper to the right or left.

49. In a machine of the class described, the combination of a gripper constructed and arranged to lay the upper of a shoe over the bottom of a last by repeated operations, means operable at will for moving the gripper laterally and turning it to the right or left while moving laterally in the same direction, and means for changing the amplitude of either the turning or lateral movements while the other remains constant.

50. In a machine of the class described, the combination of a gripper, means for moving the gripper laterally and turning it to plait the upper along a portion of the shoe, means actuated by the leg of the workman for controlling the time of operation of the gripper moving and turning means, and connections between the controlling means and gripper moving and turning means constructed and arranged to render the gripper inoperative as to either one of said movements.

51. A machine of the class described, having, in combination, lasting means including a gripper, means constructed and arranged to move the gripper laterally and to impart turning movement to the gripper in either direction as it is moved laterally in one direction, an edge gage for positioning the shoe while lasting about the ends of the shoe, another edge gage for positioning the shoe while lasting at other portions of the shoe, and leg controlled means enabling the workman to shift the position of one of the gages and render the gripper turning and laterally moving means operative to plait the upper either to the right or left at either side of the median line of the shoe.

52. A machine of the class described, having, in combination, lasting means including a gripper, means constructed and arranged to move the gripper laterally and to impart turning movement to the gripper in either direction as it is moved laterally in one direction, an edge gage for positioning the shoe while lasting about the ends of the shoe, another edge gage for positioning the shoe while lasting at other portions of the shoe, leg controlled means enabling the workman to shift the position of one of the gages and render the gripper turning and laterally moving means operative to plait the upper either to the right or left at either side of the median line of the shoe, and means for varying the amplitude of the lateral and turning movements of the gripper.

53. A machine of the class described having, in combination, lasting means including a gripper, a vibrator for moving the gripper laterally and turning it, and knee controlled means for rendering the vibrator effective or ineffective at will, including connections between the knee controlled means and vibrator constructed and arranged to enable the gripper to be turned in either direction as it is moved laterally in one direction.

54. A machine of the class described, having, in combination, lasting means including a gripper, a vibrator for imparting a turning and a lateral movement to the gripper, a controller adapted to be moved by the leg of the workman to effect movements of the gripper by the vibrator, and connections between the controller and vibrator which enable the vibrator to impart turning movement of the gripper in either direction while imparting lateral movement in one direction.

55. In a machine of the class described, the combination of a gripper constructed and arranged for laying the upper of a shoe over the bottom of a last, a vibrator connected to the gripper for imparting to it a turning and a lateral movement, a controller movable by the leg of the workman, and connections between the controller and vibrator independently adjustable to different positions to impart lateral and turning movement of variable amplitude.

56. In a machine of the class described, the combination of lasting means including a gripper for laying the upper of a shoe over the bottom of a last, means for imparting lateral movements to the gripper and turning movements in either direction with each lateral movement selectively to plait the upper either to the right or left at each side of the median line of the shoe, and means under control of the workman for determining the movements that shall be imparted to the gripper.

57. In a machine of the class described, the combination of a gripper constructed and arranged for laying the upper of a shoe over the bottom of a last, means for moving the gripper laterally and turning it to plait the upper, a controller movable at will by the leg of the workman, and means connected to the controller constructed and arranged for selectively suspending the turning or lateral movement of the gripper during the continuance of the other movement.

58. In a machine of the class described, the combination of a gripper constructed and arranged to lay the upper of a shoe over the bottom of a last, means for turning the gripper and moving it laterally to plait the upper, means for causing the turning means to turn the gripper either to the right or left with each lateral movement thereof, and means for adjusting the turning means to cause the gripper to approach the upper in grasping relation to the upper.

59. In a machine of the class described, the combination of a gripper constructed and arranged to lay the upper of a shoe over the bottom of a last, means for giving the gripper a side reach movement in one direction while treating the shoe at one side of the median line, means constructed and arranged to turn the gripper either to the right or left as it is given its side reach movement in one direction, and means for changing the position of the gripper turning means when the direction of its turning movement is changed to cause the gripper to approach the upper in grasping relation thereto.

60. In a machine of the class described, the combination of a gripper constructed and arranged to lay the upper of a shoe over the bottom of a last, means for giving the gripper a side reach movement in one direction while treating the shoe at one side of the median line and a side reach movement in the opposite direction while treating the shoe at the opposite side of the median line, means constructed and arranged to turn the gripper either to the right or left as it is given its side reach movement in one direction, and means for changing the position of the gripper turning means when the direction of its turning movement is changed to cause the gripper to approach the upper in grasping relation thereto.

61. In a machine of the class described, the combination of a gripper constructed and arranged to lay the upper of a shoe over the bottom of a last, means for moving the gripper laterally and turning it to plait the upper, and a controller connected to said means for determining when said means shall be effective or ineffective and for causing the plait to be laid to the right or left at the will of the workman while holding the shoe with both hands.

62. In a machine of the class described, the combination of a gripper constructed and arranged to lay the upper of a shoe over the bottom of a last, a train of mechanism for moving the gripper laterally, a train of mechanism for turning the gripper, means actuated by the leg of the workman for calling said trains of mechanism into operation at will to plait the upper and lay it to the last, and connections between said trains of mechanism and said means for rendering either of said trains of mechanism ineffective at the will of the workman.

63. In a machine of the class described, the combination of a gripper constructed and arranged to lay the upper of a shoe over the bottom of a last, a train of mechanism for moving the gripper laterally, a train of mechanism for turning the gripper, a shaft and a connected controller operated by the leg of the workman for calling said trains of mechanism into operation to plait the upper, and means movable to a neutral position on the controller for rendering either of said trains of mechanism ineffectual at will.

64. In a machine of the class described, the combination of a gripper for laying the upper of a shoe over the bottom of a last, means for moving the gripper laterally, means for turning the gripper to plait the upper, means under control of the workman to cause the gripper to turn to the right or left as it is moved laterally from either side of the median line of the shoe to lay the plait in either direction, and means for changing the initial position of the gripper turning means when the direction of the plait is changed to position the gripper to grasp the upper.

65. In a machine of the class described, the combination of a gripper constructed and arranged to lay the upper of a shoe over the bottom of a last, a vibrator for moving the gripper laterally and turning it to plait the upper, means under control of the workman for causing the gripper to plait the upper to the right or left at either side of the median line of the shoe, and means for changing the initial position of the vibrator when the direction of the plaiting movement is changed to position the gripper to grasp the upper.

66. In a lasting machine, the combination of a gripper and its operating means constructed and arranged for laying the margin of shoe upper over the bottom of the last by repeated operations of the gripper on different portions of the upper, a frame for supporting the operating means including a hollow column, adjustable connections between the frame and column for varying the vertical position of the frame, a shaft extending upwardly within said column and operatively connected to the operating means, a drive shaft, and means for connecting the upright shaft to the drive shaft within the column, said means permitting adjustment of the frame while driving connection between the drive shaft and the upwardly extending shaft is maintained.

67. In a lasting machine, the combination of a supporting column, a head frame connected to the supporting column for vertical adjustment, a gripper and operating means therefor mounted on the head frame, an upright shaft contained within the column for actuating the operating means, a drive shaft at the lower portion of the column and adjustable connections between the drive shaft and upright shaft permitting adjustment of the head frame while maintaining driving connections between the operating means, the upright shaft and drive shaft.

68. In a lasting machine, the combination of a supporting column, a head frame connected to the supporting column for vertical adjustment, a gripper and operating means therefor mounted on the head frame, an upright shaft extending within the column upwardly into the head frame for actuating the operating means, a drive shaft at the lower portion of the column, and splined connections between the drive shaft and upright shaft effecting driving connections between the operating means, the upright shaft and drive shaft and permitting vertical adjustment of the head while maintaining the driving connections undisturbed.

69. In a lasting machine, the combination of a supporting column, a head frame connected to the column for vertical adjustment, a gripper and operating means carried by the head frame, an upright shaft within the column extended upwardly into the head frame, a bearing in the head frame for the upright shaft, a drive shaft at the lower portion of the column, and adjustable connections between the upright shaft and drive shaft permitting the upright shaft to be moved in a vertical direction as the head frame is adjusted to accommodate the requirements of the workman while maintaining driving connections with the drive shaft.

70. In a lasting machine, the combination of a supporting column, a head frame connected to the column for vertical adjustment, a gripper and operating means carried by the head frame, an upright shaft within the column extended upwardly into the head frame, a bearing in the head frame for the upright shaft, a drive shaft at the lower portion of the column, and telescopic adjustable connections between the upright shaft and drive shaft permitting the upright shaft to be moved in a vertical direction as the head frame is adjusted to accommodate the requirements of the workman while maintaining driving connections with the drive shaft.

71. In a lasting machine, the combination of a supporting column, a head frame which is connected to the column for vertical adjustment, a gripper and its operating means carried by the head frame, a drive shaft at the lower portion of the column, a gear mounted thereon within the column, an upright shaft extending upwardly within the column into the head frame, a gear on the upright shaft within the column meshing with the gear on the drive shaft, and telescopic connections between the upright shaft and its gear within the column.

72. In a machine of the class described, the combination of a supporting column, a head frame connected to the column for vertical adjustment, a gripper constructed and arranged upon the head frame to lay the upper of a shoe over the bottom of a last, a drive shaft at the lower portion of the column, an upright transmission shaft mounted within the column and extending into the head frame for transmitting motion to the gripper, driving connections within the column between the drive shaft and upright shaft, and means permitting vertical adjustment of the head frame on the column without disturbing the operative driving connections between the drive shaft and upright shaft.

73. In a machine of the class described, the combination of a supporting column, a head frame connected to the column for vertical adjustment, a gripper constructed and arranged upon the head frame to lay the upper of a shoe over the bottom of a last, a drive shaft at the lower portion of the column, an upright transmission shaft mounted within the column and extending into the head frame for transmitting motion to the gripper, a gear on the drive shaft within the column, a second gear within the column, a support within the column for supporting the second gear, and connections between the upright shaft and the gearing within the column which permit the head of the machine to be adjusted vertically without disturbing the operative connections between the drive shaft and upright shaft.

74. In a machine of the class described, the combination of a gripper constructed and arranged to lay the upper of a shoe over the bottom of a last, a supporting column, operating mechanism within the column for actuating the gripper, including a rotary member having a cam, treadle controlled stopping and starting mechanism, a brake within the column adapted to act upon the rotary member and bring the machine to rest with the gripper in a predetermined position, and an arm actuated by the cam within the column for applying the brake when the treadle is actuated to stop the machine.

75. In a machine of the class described, the combination of a gripper constructed and arranged to lay the upper of a shoe over the bottom of a last, a rotary driver for operating the gripper, a brake for stopping the driver with the grippers in a predetermined relation with the upper, a plunger which is reciprocated by the rotary driver, a swinging arm between the plunger and the brake, and treadle actuated means for operatively connecting the swinging arm and plunger to cause the arm to be swung by the plunger and apply a braking pressure to the driver.

76. In a machine of the class described, the combination of a gripper constructed and arranged to lay the upper of a shoe over the bottom of a last, a rotary driver for operating the gripper, a brake for stopping the driver with the grippers in a predetermined relation with the upper, a plunger which is reciprocated by the rotary driver, a swinging arm between the plunger and the brake, and a latch adapted to connect the plunger and swinging arm when the treadle is actuated to stop the machine and cause the arm to move about its swinging point to apply the brake.

77. In a machine of the class described, the combination of a gripper constructed and arranged to lay the upper of a shoe over the bottom of a last, a rotary driver for operating the gripper, a brake for stopping the driver with the grippers in a predetermined relation with the upper, a plunger which is reciprocated by the rotary driver, a pivotally mounted pressure transmitting arm between the plunger and brake normally held in position with the brake inactive, and a treadle actuated latch adapted to operatively relate the pivoted transmitting arm with the plunger to apply the brake.

78. In a machine of the class described, the combination of a gripper constructed and arranged to lay the upper of a shoe over the bottom of a last, a rotary driver for operating the gripper, a brake for stopping the driver with the grippers in a predetermined relation with the upper, a plunger which is reciprocated by the rotary driver, a pivotally mounted pressure transmitting arm between the plunger and brake, a catch adjustably connected to the plunger, a latch carried by the pivoted arm, and treadle controlled means for placing the latch and the catch in operative relation to apply the brake by swinging movement of the arm when the machine is to be stopped.

79. In a machine of the class described, the combination of a hollow column, a gripper supported by the column and constructed and arranged to lay the upper of a shoe over the bottom of a last, a rotary driver housed within the column, a brake housed within the column for stopping the rotary driver with the gripper in a predetermined relation with the upper, a plunger reciprocated by the rotary driver, and a swinging pressure transmitting arm between the plunger and driver adapted to be moved by the plunger to apply the brake when the machine is to be stopped.

80. In a machine of the class described, the combination of a hollow column, a gripper supported by the column and constructed and arranged to lay the upper of a shoe over the bottom of a last, a rotary driver housed within the column, a brake housed within the column for stopping the rotary driver with the gripper in a predetermined relation with the upper, a plunger reciprocated by the rotary driver, and a swinging pressure transmitting arm between the plunger and driver adapted to be moved by the plunger to apply the brake when the machine is to be stopped.

81. In a machine of the class described, the combination of lasting means constructed and arranged to lay the upper of a shoe over the bottom of a last, power means and manual means for selectively operating the lasting means, and mechanism for preventing one of said means from being effectively operated while the other is being operated.

82. In a machine of the class described, the combination of lasting means for laying the upper of a shoe over the bottom of a last by repeated operations of said means, power actuated means for operating the lasting means, manually actuated means for operating the lasting means, and means positioned by a preliminary movement of the manually operated means for rendering the power actuated means ineffectual.

83. In a machine of the class described, the combination of lasting means for laying the upper of a shoe over the bottom of a last by repeated operations of said means, treadle controlled power actuated means for operating the lasting means, manually actuated means for operating the lasting means, and means moved by the manual means which render actuation of the treadle ineffective to start the power actuated means while the manually actuated means is being used to operate the lasting means.

84. In a machine of the class described, the combination of lasting means constructed and arranged to lay the upper of a shoe over the bottom of a last by repeated operations, a clutch, means for actuating the clutch to operate the lasting means by power, manually actuated means for operating the lasting devices, a lock normally locking the manual means in inoperative condition, and means rendered effective by a preliminary movement of the manual means from locked position for rendering the clutch actuating means ineffectual to apply the power.

85. In a machine of the class described, the combination of lasting means constructed and arranged to lay the upper of a shoe over the bottom of a last by repeated operations, a shaft for operating the lasting means, power means for operating the shaft, manual means for operating the shaft, and means common to the power means and manual means for rendering one of them ineffectual to turn the shaft while the other is effectual.

86. In a machine of the class described, the combination of lasting means constructed and arranged to lay the upper of a shoe over the bottom of a last by repeated operations, a shaft for operating the lasting means, power means and manual means for operating the shaft alternatively, and means for preventing operative connection between the shaft and one of said means while the other is operatively connected thereto.

87. In a machine of the class described, the combination of lasting means constructed and arranged to lay the upper of a shoe over the bottom of a last by repeated operations, a shaft for operating the lasting means, power means adapted to be operatively connected to said shaft, manual means adapted to be operatively connected to said shaft, and means for preventing operative connection between one of said means and the shaft while the other is operatively connected to it.

88. In a machine of the class described, the combination of lasting means constructed and arranged to lay the upper of a shoe over the bottom of a last, a shaft for operating the lasting means, power means for operating the shaft, manual means for operating the shaft, a sleeve on the shaft, and means for connecting the sleeve and shaft to render the shaft operative by the manual means and for rendering the power means ineffectual to turn the shaft.

89. In a machine of the class described, the combination of lasting means for laying the upper of a shoe over the bottom of a last, a transmission shaft for transmitting motion to the lasting means, power means and manual means for operating the shaft each to the exclusion of the other, a treadle for throwing in the power means, a hand-piece in inoperative position, and mechanism actuated by the hand-piece when it is moved from locked position for rendering the power means ineffectual.

90. In a machine of the class described, the combination of lasting means for laying the upper of a shoe over the bottom of a last, a transmission shaft for transmitting motion to the lasting means, power means and manual means for operating the shaft each to the exclusion of the other, a treadle for throwing in the power means, a hand-piece for throwing in and operating the manual means, means for locking the hand piece in inoperative position while the power means is capable of being applied to operate the machine, means for preventing manual operation of the lasting means by the hand-piece after it is unlocked and until the hand-piece is given a preliminary movement, and means actuated by preliminary movement of the hand-piece for rendering the power means ineffectual.

91. In a machine of the class described, the combination of lasting mechanism for laying the upper of a shoe over the bottom of a last, power means and manual means for operating the lasting mechanism each to the exclusion of the other, means for preventing manual operation of the machine until the manual means is given a preliminary movement, and means actuated by such preliminary movement of the manual means for rendering the power means ineffectual to operate the machine.

92. In a machine of the class described, the combination of lasting means for laying the upper of a shoe over the bottom of a last, tack driving mechanism, a tack separator, a member having a duct to receive a separated tack, said duct being arranged to allow the separated tack to lie at rest therein until required for use, and pneumatic means for moving the tack through the duct to driving position when required for use.

93. In a machine of the class described, the combination of lasting means for laying the upper of a shoe over the bottom of a last, a tack driver, a tack duct leading to the driver, means for introducing tacks singly into the duct, said duct having a substantially vertical portion through which the introduced tack will fall by gravity and a substantially horizontal portion in which the tack will lie at rest, and pneumatic means for moving the tack from its position of rest to a position beneath the driver.

94. In a machine of the class described, the combination of lasting means for laying the upper of a shoe over the bottom of a last, a tack driver, a tack separator, a member having a driver passage and a tack duct leading from the driver passage to the separator, said duct having a substantially horizontal portion where a tack released to fall through the duct by the separator will lie at rest and an upwardly and then downwardly curved portion leading from the horizontal portion to the driver passage, and pneumatic means for transferring the tack from its position of rest to the driver passage.

95. In a machine of the class described, the combination of lasting means for laying the upper of a shoe over the bottom of a last, tack driving mechanism for securing the upper in lasted position, a tack separator, a tack carrier for supporting a tack delivered by the separator, and pneumatic means for transferring the tack from its supported position on the carrier to driving position.

96. In a machine of the class described, the combination of lasting means for laying the upper of a shoe over the bottom of a last, tack driving mechanism, a tack carrier having an air duct in which a tack may lie at rest, said carrier being movable to transfer a tack from a source of supply toward driving position, and pneumatic means for moving the tack from its position in the duct to driving position.

97. In a machine of the class described, the combination of lasting means for laying the upper of a shoe over the bottom of a last, tack driving mechanism, a tack carrier constructed and arranged to carry two tacks each of which is ready for delivery to tack driving position, and pneumatic means for selectively moving either tack to driving position.

98. In a machine of the class described, the combination of lasting means for laying the upper of a shoe over the bottom of a last, tack driving mechanism, a tack carrier having a driver passage and constructed and arranged to carry two tacks for selective delivery to the driver passage, and pneumatic means for delivering either tack to the driver passage.

99. In a machine of the class described, the combination of lasting means for laying the upper of a shoe over the bottom of a last, tack-driving mechanism, a tack carrier having a driver passage and two ducts each leading to the driver passage, and pneumatic means for selectively transferring a tack from either duct to the driver passage.

100. In a machine of the class described, the combination of lasting means, a driver for securing the upper of a shoe in lasted position, a tack carrier having a driver passage and constructed and arranged to carry two tacks for delivery singly to the driver passage, and means for directing a blast of air against either tack selectively to transfer the tack to the driver passage.

101. In a machine of the class described, the combination of lasting means, a driver for securing the upper of a shoe in lasted position, a tack separator, a tack carrier having a driver passage and a tack rest for supporting a tack delivered by the separator, and means for causing a blast of air to transfer the tack from the rest to driving position.

102. In a machine of the class described, the combination of lasting means, a driver for securing the upper of a shoe in lasted position, a plurality of tack separators, a tack carrier constructed and arranged to support a plurality of tacks delivered to it from the different separators, and pneumatic means for delivering any one of the tacks to be driven.

103. In a machine of the class described, the combination of lasting means, a driver for securing the upper of a shoe in lasted position, a plurality of tack separators, a tack carrier having a tack driving passage and separate ducts leading thereto each adapted to contain a tack delivered from the separators, and pneumatic means for transferring any one of the tacks to the driver passage.

104. In a machine of the class described, the combination of lasting means for laying the upper of a shoe over the bottom of a last, a tack driver, a tack carrier, and pneumatic means made effective to deliver a tack to driving position by movement of the tack carrier.

105. In a machine of the class described, the combination of lasting means for laying the upper of a shoe over the bottom of a last, a tack driver, a tack carrier, and means for supplying compressed air to transfer a tack to the action of the driver as the tack carrier approaches forward position.

106. In a machine of the class described, the combination of lasting means for laying the upper of a shoe over the bottom of a last, a tack driver, a tack carrier, means for reciprocating the tack carrier, and pneumatic means for transfering a tack to driving position as the carrier approaches the limit of its forward reciprocation.

107. In a machine of the class described, the combination of lasting means, tack driving mechanism, a tack carrier having an air duct adapted to support a tack, and a source of compressed air supply which is adapted to send a blast of air through the duct in the tack carrier to deliver the tack to driving position.

108. In a machine of the class described, the combination of lasting means, tack driving mechanism, a tack carrier having an air duct adapted to support a tack, and a source of compressed air supply which is rendered effective to deliver a tack to driving position as the carrier moves forwardly.

109. In a machine of the class described, the combination of lasting means for laying the upper of a shoe over the bottom of a last, tack driving mechanism, a tack carrier having a duct leading to the driving passage, and a source of compressed air supply having a duct adapted to be brought into register with the duct in the tack carrier as the latter moves forwardly.

110. In a machine of the class described, the combination of lasting means for laying the upper of a shoe over the bottom of a last, fastening inserting means for securing the upper in position, means constructed and arranged to supply different kinds or sizes of fastenings appropriate to the portion of the upper that is to be secured, knee controlled means for selectively determining the kind of fastening to be supplied, and pneumatic means for transferring the desired fastening to inserting position.

111. In a machine of the class described, the combination of lasting means for laying the upper of a shoe over the bottom of a last, means for supplying either of a plurality of kinds of tacks for securing the upper in lasted position, knee operated means for controlling the supplying means, and means constructed and arranged for the use of compressed air to deliver the desired kind of tack to be driven.

112. In a machine of the class described, the combination of lasting means for laying the upper of a shoe over the bottom of a last, two edge gages constructed and arranged to be used each to the exclusion of the other, means for supplying one kind of fastening to secure the upper in lasted position along one portion of the shoe and another kind of fastening to secure the upper in lasted position along another portion of the shoe, means operated by the leg of the workman for relatively shifting the gages, and pneumatic means for delivering a tack of the desired kind for use with the gage employed.

113. In a machine of the class described, the combination of lasting means including a gripper, two edge gages, means for supplying fastenings of different kinds, knee controlled means for causing the gripper to act in one manner along one portion of the shoe and in another manner along another portion of the shoe, knee controlled means for causing the gages to be relatively shifted, and pneumatic means for delivering a tack of the appropriate kind for securing the upper.

114. In a machine of the class described, the combination of a gripper constructed and arranged to treat different portions of the shoe by repeated operations, means for imparting lateral and turning movements to the gripper to plait the upper, pneumatic means for delivering tacks for securing the upper in lasted position, and means controlled by the leg of the workman for rendering the gripper turning and laterally moving means operative or inoperative at will.

115. In a machine of the class described, the combination of lasting means including a gripper, means for imparting lateral and turning movements to the gripper to plait the upper along portions of the shoe, means for supplying tacks of one kind for securing the plaited portions of the upper and a different kind for securing the unplaited portions of the upper, pneumatic means for delivering tacks of the desired kind, and means controlled by the leg of the workman for rendering the gripper turning and lateral moving means operative or inoperative and for causing the pneumatic means to deliver the appropriate kind of tack in either case.

116. In a machine of the class described, the combination of lasting means for laying the upper of a shoe over the bottom of a last, fastening inserting mechanism, pneumatic means for delivering a fastening for the action of the inserting mechanism, and means for rendering the pneumatic delivering means inoperative for the delivery of a fastening when a shoe is not presented for treatment.

117. In a machine of the class described, the combination of lasting means for laying the upper of a shoe over the bottom of a last, fastening inserting mechanism, means constructed and arranged to cause a blast of air to deliver a fastening to the inserting mechanism, and means for automatically suspending the air blast when a shoe is not presented for treatment.

118. In a mechanism of the class described, the combination of lasting means for laying the upper of a shoe over the bottom of a last, fastening inserting mechanism, a shoe rest, means for supplying compressed air to move a fastening to inserting position, and means for suspending the supply of compressed air when a shoe is not presented against the shoe rest.

119. In a machine of the class described, the combination of lasting means including a gripper for laying the upper of a shoe over the bottom of a last, a tack carrier having a driving passage, a driver, means for supplying tacks to the tack carrier, pneumatic means for delivering a tack to driving position, and means for suspending the action of the pneumatic means when a shoe is not presented for treatment.

120. In a machine of the class described, the combination of lasting means, a driver, a tack carrier constructed and arranged for supporting tacks delivered to it from a source of supply, means for supplying compressed air to the carrier for delivering a tack to the action of the driver, and a lock to prevent the supply of compressed air to the carrier when a shoe is not presented to the machine.

121. In a machine of the class described, the combination of lasting means, a shoe rest normally in position to properly present a shoe to the lasting means, and pneumatic means for delivering a tack to be driven and rendered ineffectual by movement of the shoe rest to an abnormal position during the machine operation.

122. In a machine of the class described, the combination of lasting means for laying the upper of a shoe over the bottom of a last, fastening inserting mechanism, pneumatic means for delivering a fastening to the inserting mechanism, a shoe rest which is normally positioned to properly present a shoe to the lasting means and is movable to an abnormal position during the operation of the machine when a shoe is not presented for treatment, and means for rendering the pneumatic means ineffectual for delivering a tack when the shoe rest fails to be held in normal position by a shoe.

123. In a machine of the class described, the combination of lasting means for laying the upper of a shoe over the bottom of a last, fastening inserting mechanism, pneumatic means for delivering a fastening to the inserting mechanism, a shoe rest which is normally held in raised position when the machine is stopped with the lasting means positioned to act upon a shoe and which is adapted to drop to a lower position when the machine is operated and no shoe is presented for treatment, and means for preventing the delivery of a tack when the shoe rest drops during the operation of the machine.

124. In a machine of the class described, the combination of lasting means including a carrier having a driving passage and a plurality of ducts communicating with the driver passage, means for moving the carrier toward and from the shoe during the lasting operation, air ducts constructed and arranged to communicate with the ducts in the carrier as the latter is moved toward the shoe, and means for selectively inducing an air current through one of said ducts to transfer a tack to driving position.

125. In a machine of the class described, the combination of lasting means including a carrier having a driving passage and a plurality of ducts communicating with the driver passage, means for moving the carrier toward and from the shoe during the lasting operation, air ducts constructed and arranged to communicate with the ducts in the carrier as the latter is moved toward the shoe, means for selectively inducing an air current through one of said ducts to transfer a tack 126. In a machine of the class described, the combination of lasting means including a tack carrier constructed and arranged to carry a plurality of tacks and move them toward the shoe, means for direcing a blast of air against any one of the tacks on the carrier to transfer it to driving position, and means for suspending the blast of air when the workman fails to present a shoe for treatment.

127. In a machine of the class described, the combination of lasting means including a tack carrier having a driving passage, a plurality of conduits on the carrier communicating with the driver passage and each provided with a tack rest, and means for directing a blast of air into either conduit on the carrier after the carrier has moved a predetermined distance toward the shoe.

128. In a machine of the class described, the combination of lasting means including a tack carrier having a driving passage, a plurality of conduits on the carrier communicating with the driver passage and each provided with a tack rest, means for directing a blast of air into either conduit on the carrier after the carrier has moved a predetermined distance toward the shoe, and a shoe rest which is held to properly locate a shoe as the workman presents it to the machine and is adapted to move to another position in case the workman fails to present a shoe for treatment before the carrier has moved the predetermined distance.

129. In a machine of the class described, the combination of lasting means including a movable tack carrier, a shoe rest constructed and arranged to be held in a fixed position properly to locate a shoe for the action of the lasting means as the workman presents the shoe for treatment and adapted to move to another position when a shoe is not presented for treatment, and means for preventing movement of the shoe rest from its fixed position until after the tack carrier has been moved toward the shoe a predetermined amount.

130. In a machine of the class described, the combination of lasting means including a movable tack carrier, a shoe rest constructed and arranged to be held in a fixed position properly to locate a shoe for the action of the lasting means as the workman presents the shoe for treatment and adapted to move to another position when a shoe is not presented for treatment, means for preventing movement of the shoe rest from its fixed position until after the tack carrier has been moved toward the shoe a predetermined amount, and means rendered effective for delivering a tack to the tack passage when a shoe is presented for treatment before the predetermined movement of the tack carrier has been completed.

131. In a machine of the class described, the combination of lasting means including a movable tack carrier, a shoe rest constructed and arranged to be held in a fixed position properly to locate a shoe for the action of the lasting means as the workman presents the shoe for treatment and adapted to move to another position when a shoe is not presented for treatment, means for preventing movement of the shoe rest from its fixed position until after the tack carrier has been moved toward the shoe a predetermined amount, and air pressure means rendered effective for delivering a tack to the tack passage when a shoe is presented for treatment before the predetermined movement of the tack carrier has been completed.

132. In a machine of the class described, the combination of lasting means including a reciprocating tack carrier having a tack driving passage and conduits leading thereto, air pressure means having air conduits which are placed in communication with the conduits in the tack carrier as the carrier is moved toward the shoe impulsively to move a tack into the driving passage, and means for preventing the air delivery of a tack to the driving passage when a shoe fails to be presented for treatment.

133. In a machine of the class described, the combination of a gripper, means for closing the gripper to cause it to grasp the upper, means for imparting an updraw movement to the gripper, and means for relieving the retarding effect of the gripper closing means upon gripper movement responsive to the updraw means.

134. In a machine of the class described, the combination of a gripper, yielding means for closing the gripper with a yielding pressure upon the upper, means for imparting an updraw movement to the gripper after it has grasped the upper, and a mounting for the gripper closing means constructed and arranged to relieve the retarding effect of the gripper closing means upon gripper movement responsive to the updraw.

135. In a machine of the class described, the combination of a gripper, a gripper closing and opening lever fulcrumed for movement in one direction for closing and opening the gripper and having a second fulcrum for movement of the lever in another direction during the gripper updraw, and means for relieving the retarding effect of the gripper closing and opening lever upon the updraw when the lever is moved about the second fulcrum.

136. In a machine of the class described, the combination of a gripper, a gripper closing lever, a cam acting yieldingly through the lever for closing the gripper upon the upper means, for imparting an updraw movement to the gripper, and a support for the pivot of the gripper closing lever constructed and arranged to be displaced during the updraw to relieve the retarding effect of the yieldingly acting gripper closing cam upon the updraw.

137. In a machine of the class described, the combination of a gripper, gripper updraw means, and gripper closing means mounted for movement in one direction for closing the gripper upon the upper and in another direction during the gripper updraw.

138. In a machine of the class described, the combination of a gripper, gripper updraw means, gripper closing means including a spring, and means for relieving the retarding effect of the spring on the gripper updraw.

139. In a machine of the class described, the combination of a gripper, a gripper carrier, a gripper updraw slide yieldingly connected to the gripper carrier to effect the updraw, a cam, and a projection extending from the updraw slide and engaging the cam.

140. In a machine of the class described, the combination of a gripper, a gripper slide mounted for reciprocating movement, adjustable connections between the gripper and gripper slide, a cam, and a projection or roll carried by the slide and engaging the cam.

141. In a machine of the class described, the combination of a gripper, means for causing, at the selection of the operator, either turning movements or lateral movements to be imparted to the gripper to plait the upper, and means for varying the amplitude of the selected movements controlled by the leg or body of the workman while both hands hold the shoe.

142. In a machine of the class described, the combination of a gripper, gripper operating mechanism constructed and arranged to tension the stock varying amounts determined by the characteristics of the stock, and means for varying the time of gripper release in accordance with the stock tensioning movements.

143. In a machine of the class described, the combination of a gripper, gripper operating mechanism constructed and arranged to have stock tensioning movements which vary with a characteristic of the stock, and means for varying the time of release of the gripper determined by the characteristic of the stock.

144. A machine of the class described having, in combination, lasting mechanism for lasting one portion of a shoe, said mechanism being constructed and arranged to be shifted to adapt it for lasting another portion of the shoe, and means for shifting said mechanism comprising a power-operated pawl, a ratchet operated by the pawl, connections from said ratchet to said mechanism to effect the shifting thereof when actuated by the ratchet and the pawl, a pawl protector normally preventing action of the pawl on the ratchet, and manually controlled means for shifting the protector to cause the shifting of said mechanism to be effected.

145. In a machine of the class described, the combination of lasting means for laying the upper of a shoe over the bottom of a last, two edge gages constructed and arranged to be used each to the exclusion of the other, means comprising a cam for controlling the relative position of the gages, a ratchet wheel connected to the cam, a power-operated pawl arranged to operate the ratchet wheel, a pawl protector for normally preventing movement of the pawl from operating the ratchet wheel, and manually controlled means for shifting the protector to permit action of the pawl on the ratchet wheel.

146. In a machine of the class described, the combination of lasting means for laying the upper of a shoe over the bottom of a last, means for supplying one kind of fastening to secure the upper in lasted position along one portion of the shoe or another kind of fastening to secure the upper in lasted position along another portion of the shoe, means comprising a cam for controlling the kind of tack, a ratchet wheel connected to the cam, a power-operated pawl arranged to operate the ratchet wheel, a pawl protector for normally preventing movement of the pawl from operating the ratchet wheel, and manually controlled means for shifting the protector to permit action of the pawl upon the ratchet wheel.

147. In a machine of the class described, the combination of lasting means for laying the upper of a shoe over the bottom of a last, two edge gages constructed and arranged to be used each to the exclusion of the other, means for supplying one kind of fastening to secure the upper in lasted position along one portion of the shoe and another kind of fastening to secure the upper in lasted position along another portion of the shoe, means comprising a cam for controlling the kind of tack and the relative position of the gages, a ratchet wheel connected to the cam, a power-operated pawl arranged to operate the ratchet wheel, a pawl protector for normally preventing movement of the pawl from operating the ratchet wheel, and manually controlled means for shifting the protector to permit action of the pawl and the ratchet wheel.

148. In a machine of the class described, the combination of lasting means for laying the upper of a shoe over the bottom of a last, two edge gages constructed and arranged to be used each to the exclusion of the other, means for supplying one kind of fastening to secure the upper in lasted position along one portion of the shoe and another kind of fastening to secure the upper in lasted position along another portion of the shoe, means comprising a cam for controlling the kind of tack and the relative position of the gages, a ratchet wheel connected to the cam, a power-operated pawl arranged to operate the ratchet wheel, a pawl shield having a protector for normally preventing movement of the pawl from operating the ratchet wheel, manually controlled means for shifting the shield to permit action of the pawl on the ratchet wheel, and means on the shield and cooperating with the ratchet wheel for preventing reverse movement of the shield until power movement of the ratchet wheel has been effected by the power-operated pawl.

149. In a machine of the class described, the combination of lasting means for laying the upper of a shoe over the bottom of the last, two edge gages constructed and arranged to be used each to the exclusion of the other, means for supplying one kind of fastening to secure the upper in lasted position along one portion of the shoe and another kind of fastening to secure the upper in lasted position along another portion of the shoe, means comprising a cam for controlling the kind of tack and the relative position of the gages, a ratchet wheel connected to the cam, a power-operated pawl arranged to operate the ratchet wheel, a pawl shield and protector yieldingly held in position to prevent movement of the pawl from operating the ratchet wheel, manually operated means for moving the shield in one direction to permit action of the pawl to turn the ratchet wheel, and means operated by the ratchet wheel to release the manually operated means and permit return of the shield and protector to protecting position.

150. In a machine of the class described, the combination of lasting means including a movable tack carrier, a shoe rest constructed and arranged to be held in a normal position properly to locate a shoe for the action of the lasting means during a portion of the cycle of the machine and to be released for movement to an abnormal position during another portion of the cycle of the machine, such movement being prevented by presence of the shoe in lasting position, and means acting when the rest is in normal position for presenting a tack to the tack carrier in each cycle, said means being rendered inoperative when the rest is permitted to move to its abnormal position by failure of the workman to present a shoe to the machine.

151. In a machine of the class described, the combination of lasting means including a movable tack carrier, a shoe rest constructed and arranged to be held by operation of the machine in a position properly to locate a shoe for the action of the lasting means during a portion of the machine's cycle and to be released during another portion of the cycle for movement into another position unless held in its initial position by a shoe presented for treatment, means for separating a tack once in each cycle while the shoe rest is held in initial position, and means for preventing such separation when the rest is allowed to move to its other position.

152. In a machine of the class described, the combination of lasting means including a movable tack carrier, a shoe rest constructed and arranged to be held in the stopped position of the machine in a position properly to locate a shoe for the action of the lasting means, means for releasing the rest during a later portion of the cycle of the machine to permit the rest to move by gravity to another position, and means acting when the rest is held in normal position by presentation of a shoe for presenting a tack to the tack carrier in each cycle, said means being rendered inoperative when the rest is permitted to move to its other position by failure of the workman to present a shoe to the machine.

153. In a lasting machine, the combination with suitable actuating and supporting mechanism, of a longitudinally movable rod having an upper gripping jaw formed thereon, a pivoted lower jaw, and means for actuating the lower jaw by movement of the rod to cause mutual approaching movement of the jaws.

154. In a lasting machine of the class described, the combination of a movable gripper bar, a gripper jaw arranged for sliding movement in the bar, a cooperating jaw pivoted to the bar, and means for mutually operating the jaws, one by sliding movement and the other by pivotal movement.

155. In a lasting machine of the class described, a gripper bar, a rod slidable longitudinally in the bar and having a gripping face arranged at an angle to the direction of said rod, a lever pivoted to the bar, one arm of said lever being provided with a gripping face to cooperate with the gripping face on the rod, and a link connecting the other arm of said lever with the rod.

In testimony whereof I have signed my name to this specification.

THOMAS H. SEELY.